United States Patent
Lee et al.

(10) Patent No.: US 12,549,652 B2
(45) Date of Patent: Feb. 10, 2026

(54) FLEXIBLE DISPLAY AND ELECTRONIC DEVICE INCLUDING THE SAME

(71) Applicant: Samsung Electronics Co., Ltd., Suwon-si (KR)

(72) Inventors: Wonho Lee, Suwon-si (KR); Junyoung Choi, Suwon-si (KR); Hojin Jung, Suwon-si (KR); Hyoungtak Cho, Suwon-si (KR); Hyunggwang Kang, Suwon-si (KR); Yangwook Kim, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 779 days.

(21) Appl. No.: 17/852,624

(22) Filed: Jun. 29, 2022

(65) Prior Publication Data
US 2023/0007111 A1     Jan. 5, 2023

Related U.S. Application Data

(63) Continuation of application No. PCT/KR2022/008068, filed on Jun. 8, 2022.

(30) Foreign Application Priority Data

Jul. 2, 2021 (KR) .......... 10-2021-0086944
Aug. 25, 2021 (KR) .......... 10-2021-0112432
Nov. 16, 2021 (KR) .......... 10-2021-0157526

(51) Int. Cl.
*H04M 1/02*     (2006.01)
*G06F 1/16*     (2006.01)

(52) U.S. Cl.
CPC ........ *H04M 1/0235* (2013.01); *G06F 1/1624* (2013.01); *G06F 1/1652* (2013.01); *H04M 1/0268* (2013.01); *H04M 2201/38* (2013.01)

(58) Field of Classification Search
CPC ............ H04M 1/0235; H04M 1/0268; H04M 2201/38; H04M 1/0237; G06F 1/1624; G06F 1/1652
See application file for complete search history.

(56) References Cited

U.S. PATENT DOCUMENTS 10,747,269 B1     8/2020    Choi et al.
2019/0317550 A1*   10/2019   Kim .................. H04N 23/54
(Continued)

FOREIGN PATENT DOCUMENTS

CN          212876187 U     4/2021
KR     10-2005-0078800 A    8/2005
(Continued)

OTHER PUBLICATIONS

International Search Report dated Sep. 5, 2022, issued in International Application No. PCT/KR2022/008068.
(Continued)

*Primary Examiner* — Joseph E Dean, Jr.
(74) *Attorney, Agent, or Firm* — Jefferson IP Law, LLP

(57) ABSTRACT

An electronic device is provided. The electronic device includes a first housing, a second housing in which a rack being configured to guide sliding of the first housing is disposed, a flexible display including a first area and a second area extending from the first area and configured to be bendable or rollable, a motor disposed on the first housing and configured to be capable of sliding relative to the second housing, the motor being configured to transmit a driving force to a gear configured to rotationally move along the rack, and a first electrical component disposed in the first housing and configured to be capable of sliding together with the motor, wherein the motor may be disposed not to overlap the second area of the flexible display.

15 Claims, 23 Drawing Sheets

(56) References Cited

U.S. PATENT DOCUMENTS

| | | |
|---|---|---|
| 2020/0033913 A1 | 1/2020 | Yang |
| 2021/0103314 A1* | 4/2021 | Ko .................. G06F 1/1681 |
| 2021/0135492 A1 | 5/2021 | Kim et al. |
| 2021/0195008 A1 | 6/2021 | Lee |

FOREIGN PATENT DOCUMENTS

| | | |
|---|---|---|
| KR | 10-2011-0002366 A | 1/2011 |
| KR | 10-1107127 B1 | 1/2012 |
| KR | 10-1179115 B1 | 9/2012 |
| KR | 10-1218681 B1 | 1/2013 |
| KR | 10-2019-0115888 A | 10/2019 |
| KR | 10-2021-0041380 A | 4/2021 |
| WO | 2020/256183 A1 | 12/2020 |
| WO | 2021/015329 A1 | 1/2021 |

OTHER PUBLICATIONS

Written Opinion dated Sep. 5, 2022, issued in International Application No. PCT/KR2022/008068.
European Search Report dated Jan. 31, 2025, issued in European Application No. 22833428.0.
European Search Report dated Sep. 23, 2024, issued in European Application No. 22833428.0.

* cited by examiner

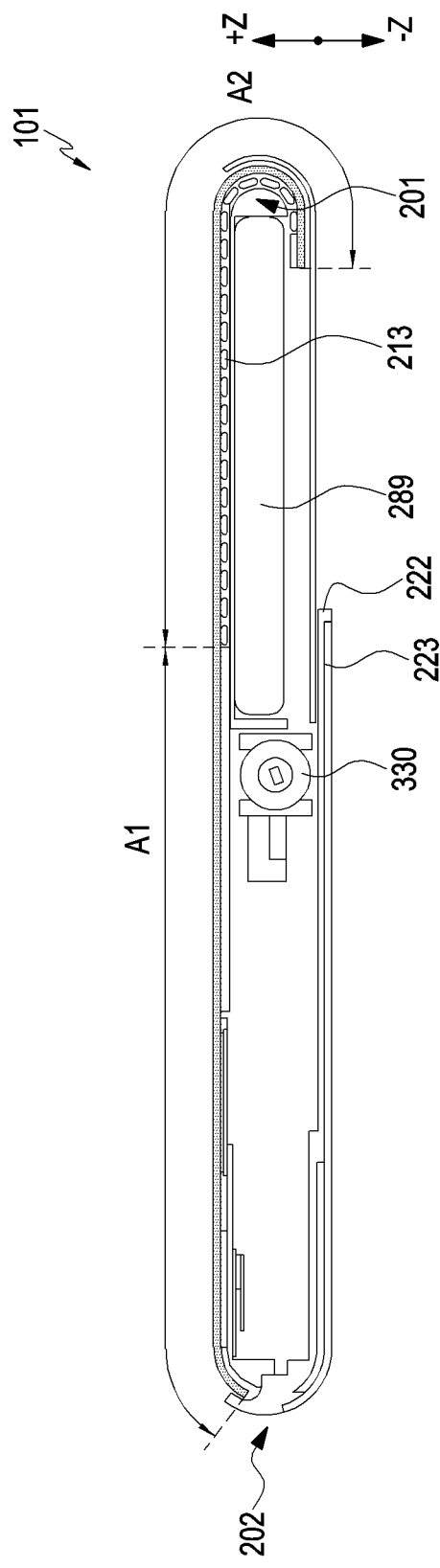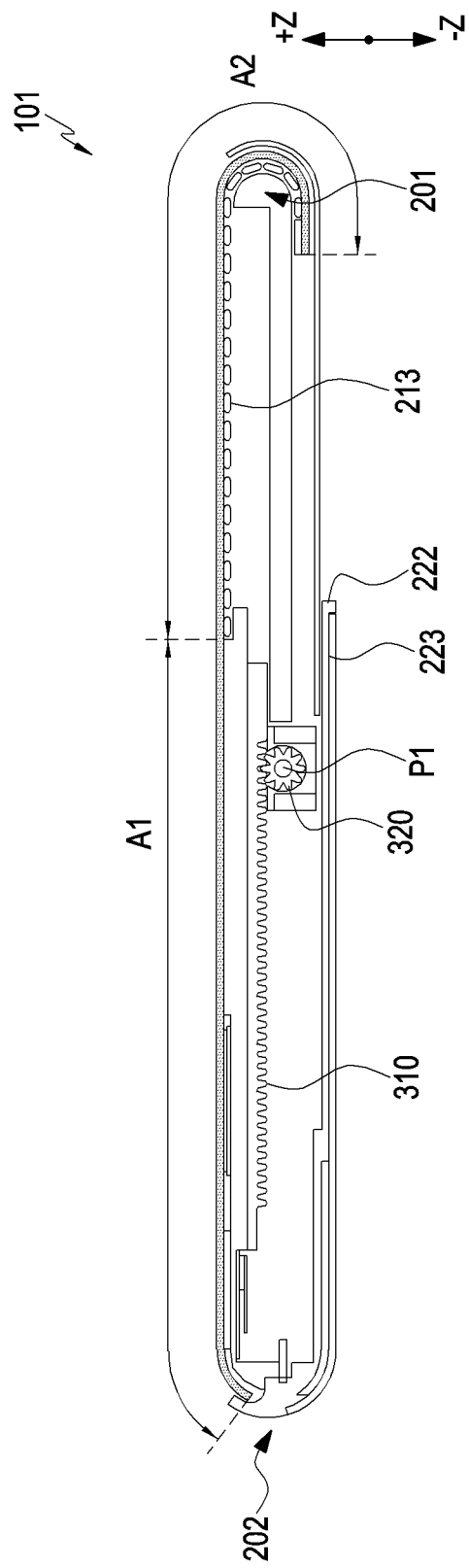
FIG.10A
FIG.10B

FLEXIBLE DISPLAY AND ELECTRONIC DEVICE INCLUDING THE SAME

CROSS-REFERENCE TO RELATED APPLICATION(S)

This application is a continuation application, claiming priority under § 365(c), of an International application No. PCT/KR2022/008068, filed on Jun. 8, 2022, which is based on and claims the benefit of a Korean patent application number 10-2021-0086944, filed on Jul. 2, 2021, in the Korean Intellectual Property Office, of a Korean patent application number 10-2021-0112432, filed on Aug. 25, 2021, in the Korean Intellectual Property Office, and of a Korean patent application number 10-2021-0157526, filed on Nov. 16, 2021, in the Korean Intellectual Property Office, the disclosure of each of which is incorporated by reference herein in its entirety.

TECHNICAL FIELD

The disclosure relates to a flexible display and an electronic device including the same.

BACKGROUND ART

With the development of electronic, information, and communication technologies, various functions are being integrated into one portable communication device or electronic device. For example, a smartphone includes functions of a sound reproduction device, an imaging device, and a digital diary, in addition to a communication function, and further various functions may be implemented in the smart phone through additional installation of applications.

As the use of personal or portable communication devices, such as smallphones, has become common, users' demands for portability and ease of use are increasing. For example, a touch screen display may provide a virtual keypad that replaces a mechanical input device (e.g., a button input device) while serving as an output device that outputs a screen (e.g., visual information). Accordingly, a portable communication device or an electronic device is capable of providing the same or further improved usability (e.g., a larger screen) while being miniaturized. On the other hand, with the commercialization of flexible, for example, foldable or rollable displays, the portability and ease of use of electronic devices are expected to further improve.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

In an electronic device including a flexible display expandable by sliding, structures of the electronic device may move (e.g., slide, rotate, or pivot) relative to each other. In this case, some structures (e.g., a first housing and a partial area of the flexible display) may move into or away from another structure (e.g., a second housing).

In the electronic device, a structure expandable according to sliding requires a design of a driving structure that is capable of providing a strong force without increasing the thickness of the electronic device, while a flexible display is capable of executing a slide-in/out operation for user convenience.

Aspects of the disclosure are to address at least the above-mentioned problems and/or disadvantages and to provide at least the advantages described below. Accordingly, an aspect of the disclosure is to provide a driving structure including a driving motor that is capable of providing a strong thrust, while a flexible display is capable of performing a slide-in/out operation.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a first housing, a second housing in which a rack being configured to guide a sliding of the first housing is disposed, a flexible display including a first area and a second area extending from the first area and configured to be bendable or rollable, a motor disposed on the first housing and configured to be capable of sliding relative to the second housing, the motor being configured to transmit a driving force to a gear configured to rotationally move along the rack, and a first electrical component disposed in the first housing and configured to be capable of sliding together with the motor, wherein the motor is disposed so as not to overlap the second area of the flexible display.

In accordance with another aspect of the disclosure, an electronic device is provided. The electronic device includes a first housing, a second housing configured to guide a sliding movement of the first housing, a flexible display including a first area and a second area extending from the first area and configured to be bendable or rollable, and a driving structure configured to provide automatic slide-in/out of the first housing and the flexible display. The driving structure includes a rack disposed in the second housing along the sliding direction, a motor disposed in the first housing not to overlap the second area of the flexible display, a gear rotatably connected to an end of the motor and configured to move along the rack, and a connection board disposed adjacent to the motor and the rack.

Advantageous Effects

According to various embodiments, it is possible to provide an electronic device in which the relative movement of housings and the slide-in/out operation of the flexible display are stably performed.

In the electronic device according to various embodiments of the disclosure, since the motor having a driving structure for slide-in and slide-out operations of the flexible display is disposed so as not to overlap the flexible display, it is possible to enlarge a motor mounting space. Accordingly, the thickness of the electronic device can be slimmed, and a motor having a torque for improved sliding of the flexible display can be mounted.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIG. 10A is a cross-sectional view taken along line C-C' in FIG. 8, according to an embodiment of the disclosure;

FIG. 10B is a cross-sectional view taken along line D-D' in FIG. 8, according to an embodiment of the disclosure;

Throughout the drawings, it should be noted that like reference numbers are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
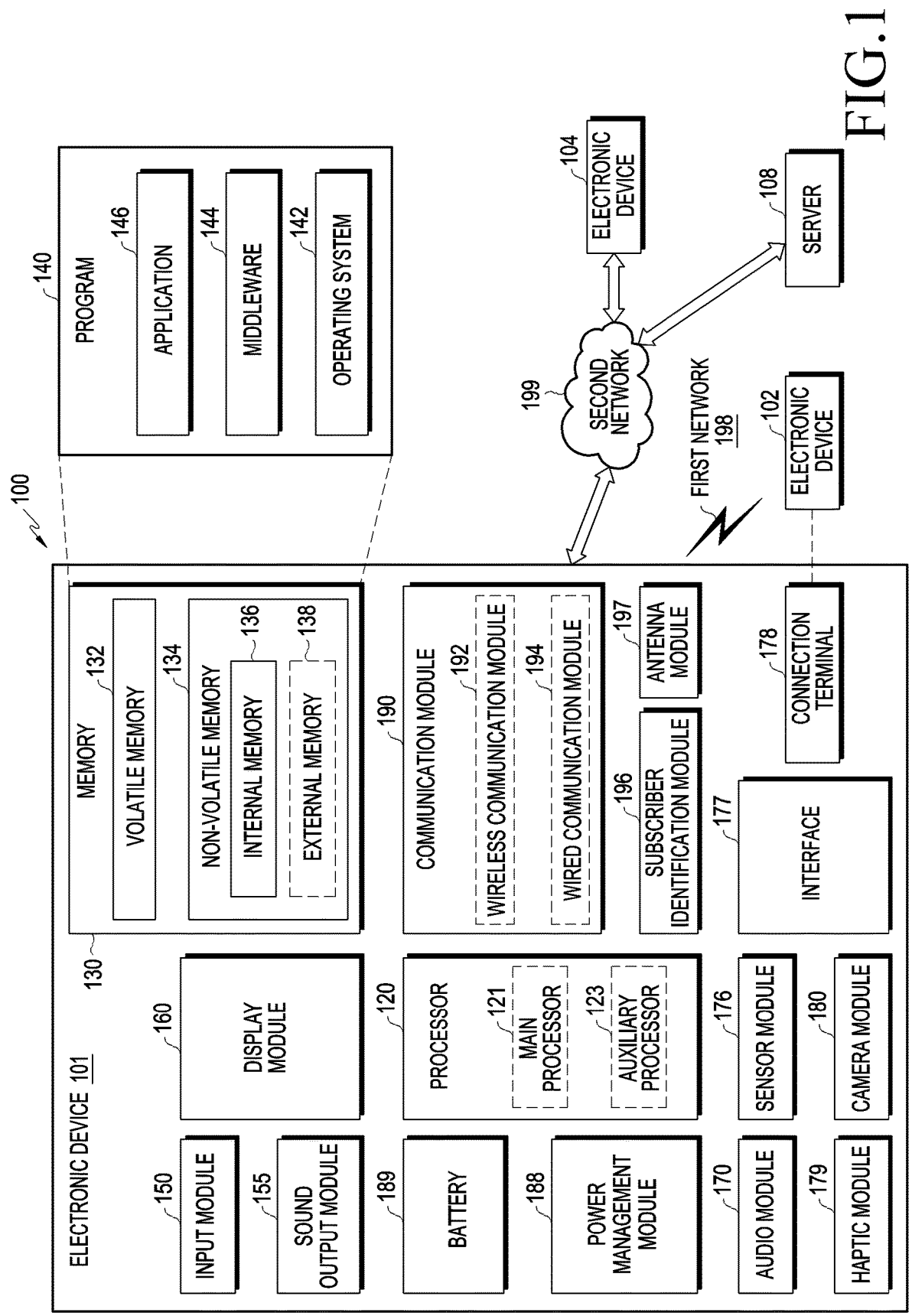
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108.

For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smailphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
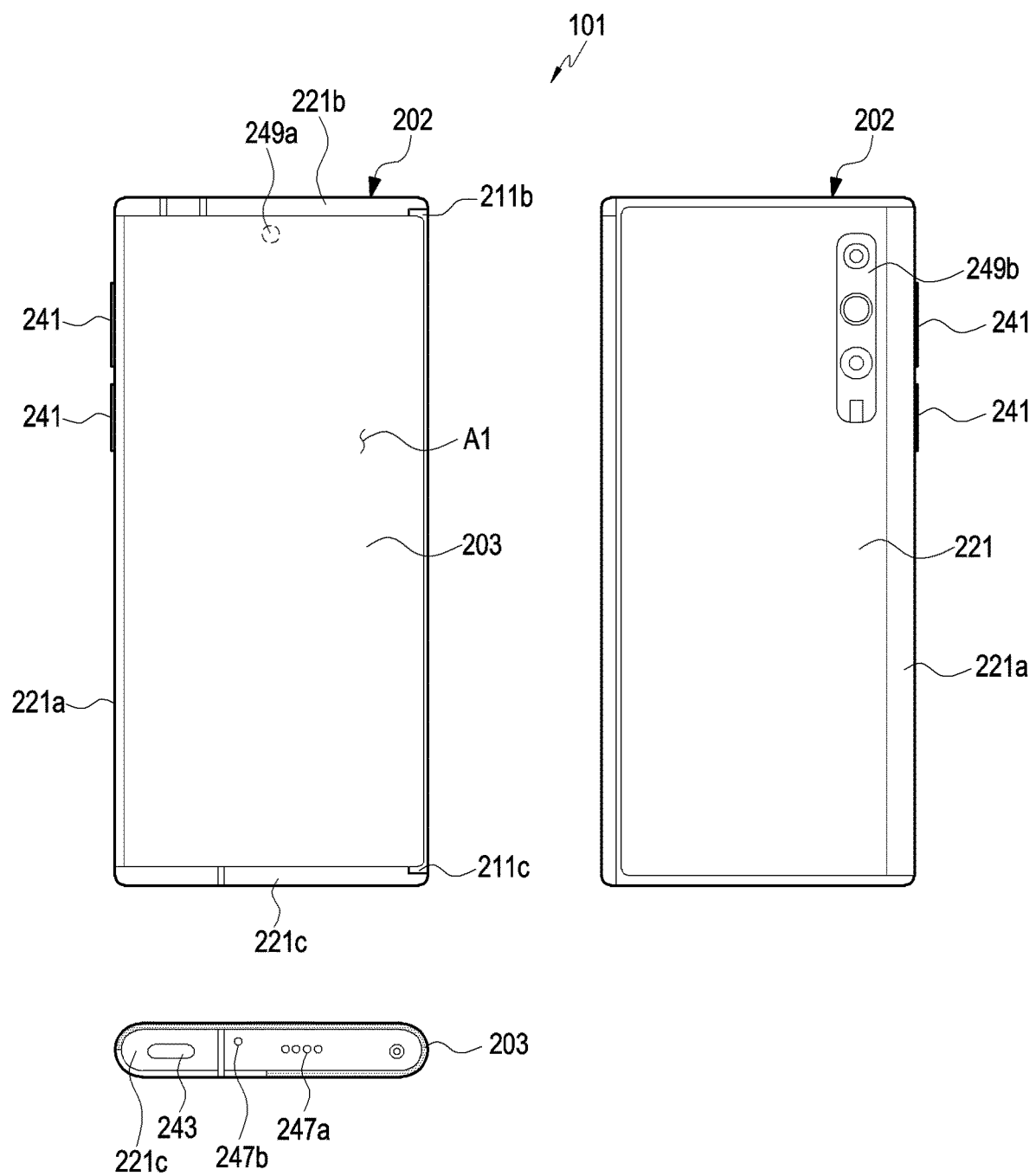
FIG. 2A is a view illustrating a state in which a second display area of a flexible display is accommodated in a second housing, according to an embodiment of the disclosure.
Figure 2B:
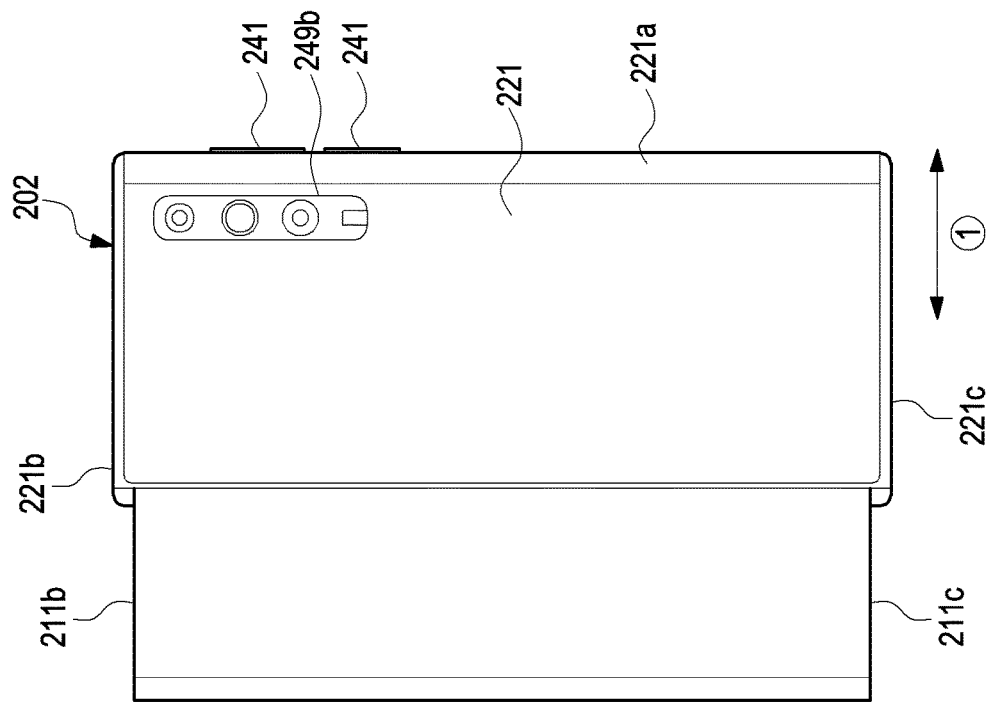
FIG. 2B is a view illustrating a state in which the second display area of the flexible display is exposed to the outside of the second housing, according to an embodiment of the disclosure.
Figure 2B:
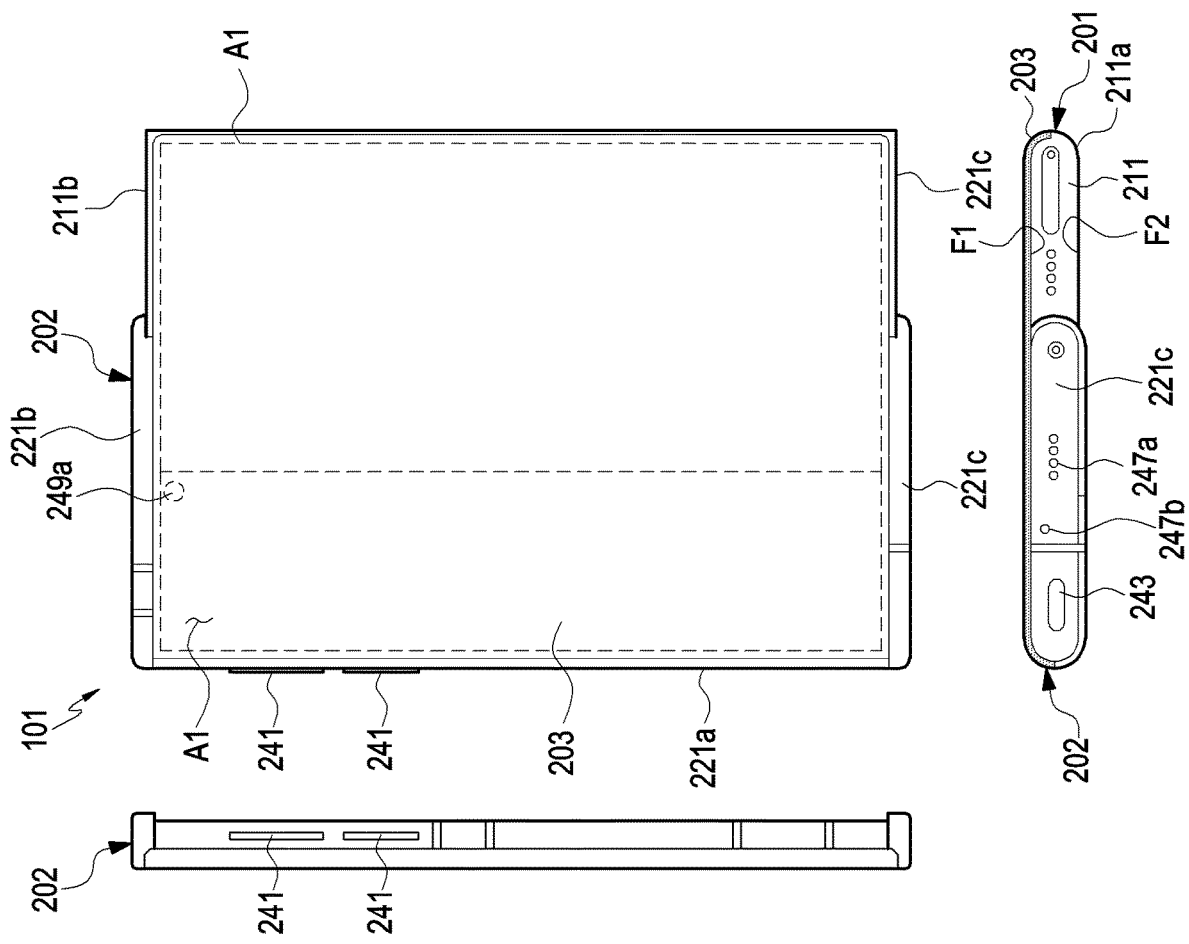

FIG. 2A is a view illustrating a state in which a second display area of a flexible display is accommodated in a second housing, according to an embodiment of the disclosure. FIG. 2B is a view illustrating a state in which the second display area of the flexible display is exposed to the outside of the second housing, according to an embodiment of the disclosure.

Figure 3A:
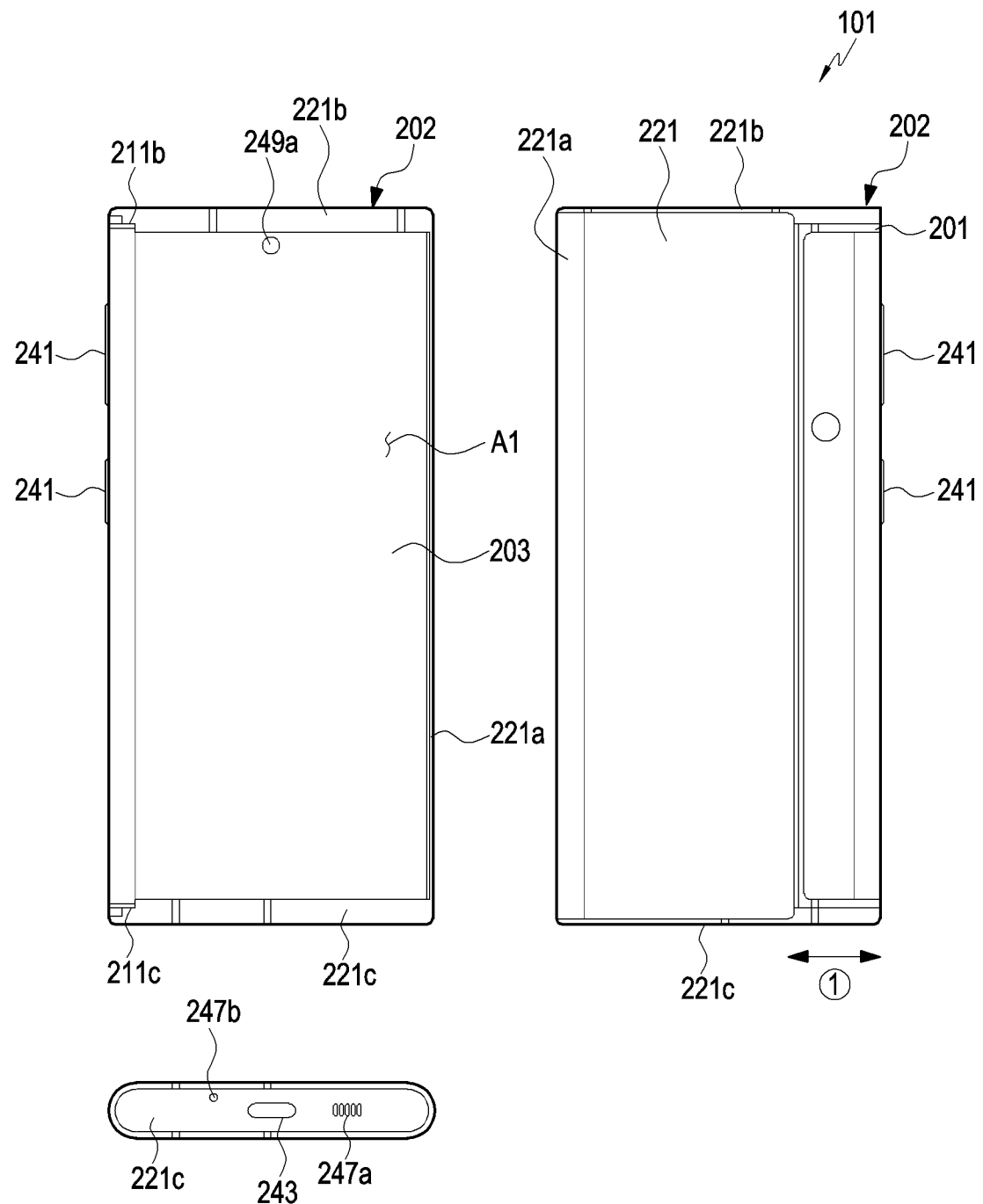
FIG. 3A is a view illustrating a state in which a second display area of a flexible display is accommodated in a second housing, according to an embodiment of the disclosure.
Figure 3B:
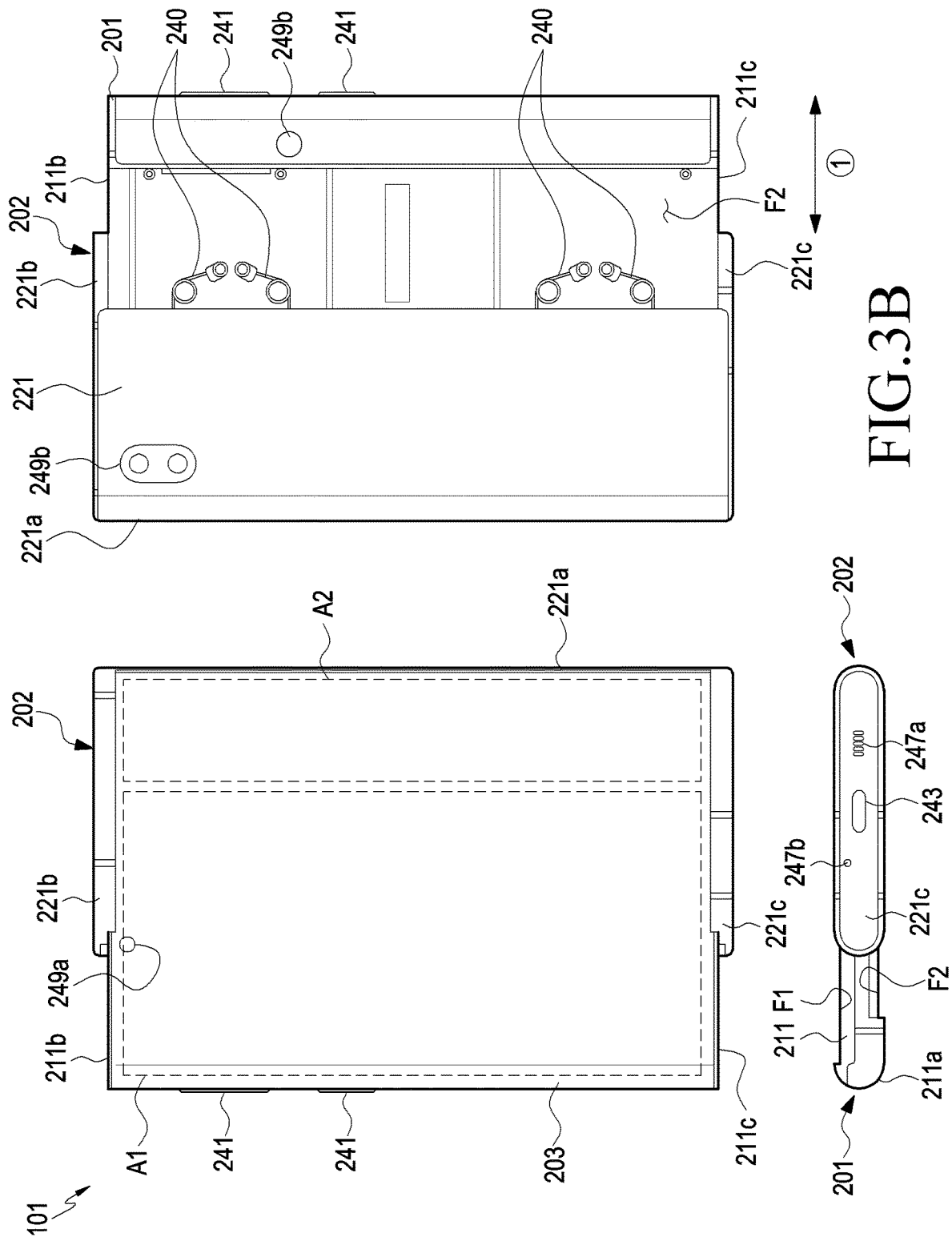
FIG. 3B is a view illustrating a state in which the second display area of the flexible display is exposed to the outside of the second housing, according to an embodiment of the disclosure.

FIG. 3A is a view illustrating a state in which a second display area of a flexible display is accommodated in a second housing, according to an embodiment of the disclosure. FIG. 3B is a view illustrating a state in which the second display area of the flexible display is exposed to the outside of the second housing, according to an embodiment of the disclosure.

FIGS. 2A and 2B illustrate a structure in which a flexible display 203 is expanded rightward when viewed from the front side of the electronic device 101, and FIGS. 3A and 3B illustrate a structure in which a flexible display 203 is expanded leftward when viewed from the front side of the electronic device 101. The description of the configuration of the electronic device 101 in FIGS. 2A and 2B is applicable to the configuration of the electronic device 101 in FIGS. 3A and 3B. The state illustrated in FIG. 2A may be defined as the state in which the first housing 201 is closed relative to the second housing 202, and the state illustrated in FIG. 2B may be defined as the state in which the first housing 201 is opened relative to the second housing 202. According to an embodiment of the disclosure, the "closed state" or the "opened state" may be defined as the state in which the electronic device is closed or the state in which the electronic device is opened.

Referring to FIGS. 2A and 2B, the electronic device 101 may include housings 201 and 202. The housings 201 and 202 may include a second housing 202 and a first housing 201 disposed to be movable relative to the second housing 202. In some embodiments, the electronic device 101 may be interpreted as a structure in which the second housing 202 is disposed to be slidable on the first housing 201.

According to an embodiment, the first housing 201 may be disposed to be reciprocable by a predetermined distance in the illustrated direction (e.g., the direction indicated by arrow 1̂) relative to the second housing 202. The configuration of the electronic device 101 of FIGS. 2A and 2B may be wholly or partly the same as the that of the electronic device 101 of FIG. 1.

According to various embodiments, the first housing 201 may be referred to as, for example, a first structure, a slide unit, or a slide housing, and may be disposed to be reciprocable on the second housing 202. According to an embodiment, the first housing 201 may accommodate various electrical and electronic components such as a circuit board and a battery. The second housing 202 may be referred to as a second structure, a main unit, or a main housing, and may guide the movement of the first housing 101. A portion of the display 203 (e.g., a first display area A1) may be seated on the first housing 201. According to an embodiment, when the first housing 201 moves (e.g., slides) relative to the second housing 202, another portion of the display 203 (e.g., a second display area A2) may be accommodated inside the second housing 202 (e.g., a slide-in operation) or exposed to the outside of the second housing 202 (e.g., a slide-out operation). According to an embodiment, a motor, a speaker, a SIM socket, and/or a sub-circuit board electrically connected to a main circuit board may be disposed in the first housing 201. The main circuit board on which electrical components such as an application processor (AP) and a communication processor (CP) are mounted may be disposed in the second housing 202.

According to various embodiments, the first housing 201 may include a first plate 211 (e.g., a slide plate). The first plate 211 may include a first surface (e.g., the first surface F1 in FIG. 2B) forming at least a portion thereof and a second surface F2 facing away from the first surface F1. According to an embodiment, the first plate 211 may support at least a portion of the display 203 (e.g., the first display area A1). According to an embodiment, the first housing 201 may include a first plate 211, a $(1-1)^{th}$ sidewall 211a extending from the first plate 211, a $(1-2)^{th}$ sidewall 211b extending from the $(1-2)^{th}$ sidewall 211a and the first plate 211, and a $(1-3)^{th}$ sidewall 211c extending from the $(1-1)^{th}$ sidewall 211a and the first plate 211 and parallel to the $(1-2)^{th}$ sidewall 211b.

According to various embodiments, the second housing 202 may include a second plate (e.g., the second plate 221 and the main case in FIGS. 4A and 4B), a $(2-1)^{th}$ sidewall 221a extending from the second plate 221, a $(2-2)^{th}$ sidewall 221b extending from the $(2-1)^{th}$ sidewall 221a and the second plate 221, and a $(2-3)^{th}$ sidewall 221c extending from the (2-1) sidewall 221a and the second plate 221 and parallel to the $(2-2)^{th}$ sidewall 221b. According to an embodiment, the $(2-2)^{th}$ sidewall 221b and the $(2-3)^{th}$ sidewall 221c may be configured to be perpendicular to the $(2-1)^{th}$ sidewall 221a. According to an embodiment, the second plate 221, the $(2-1)^{th}$ sidewall 221a, the $(2-2)^{th}$ sidewall 221b, and the $(2-3)^{th}$ sidewall 221c may have a shape opened on one side (e.g., the front surface) to accommodate (or surround) at least a portion of the first housing 201. For example, the first housing 201 may be coupled to the second housing 202 in a state of being at least partially surrounded and may be slidable in a direction parallel to the first surface F1 or the second surface F2 (e.g., the direction indicated by arrow 1̂) while being guided by the second housing 202. According to an embodiment, the second plate 221, the $(2-1)^{th}$ sidewall 221a, the $(2-2)^{th}$ sidewall 221b, and/or the $(2-3)^{th}$ sidewall 221c may be integrally configured. According to another embodiment, the second plate 221, the $(2-1)^{th}$ sidewall 221a, the $(2-2)^{th}$ sidewall 221b, and/or the $(2-3)^{th}$ sidewall 221c may be configured as separate housings and coupled or assembled to each other.

According to various embodiments, the second plate 221 and/or the $(2-1)^{th}$ sidewall 221a may cover at least a portion of the flexible display 203. For example, at least a portion of the flexible display 203 may be accommodated in the inside of the second housing 202, and the second plate 221 and/or the $(2-1)^{th}$ sidewall 221a may cover a portion of the flexible display 203 accommodated in the inside of the second housing 202.

According to various embodiments, the first housing 201 may be movable in a first direction (e.g., direction 1̂) parallel to the $(2-2)^{th}$ sidewall 221b or the $(2-3)^{th}$ sidewall 221c to the opened state or the closed state relative to the second housing 202, and the first housing 201 may be movable to be positioned at a first distance from the $(2-1)^{th}$ sidewall 221a in the closed state and at a second distance, which is greater than the first distance, from the first sidewall 221a in the opened state. According to an embodiment of the disclosure, in the closed state, the first housing 201 may surround a portion of the $(2-1)^{th}$ sidewall 221a.

According to various embodiments, the electronic device 101 may include a display 203, key input devices 241, a connector hole 243, audio modules 247a and 247b, or camera modules 249a and 249b. Although not illustrated, the electronic device 101 may further include an indicator (e.g., a light-emitting diode (LED) device) or various sensor modules. The configurations of the display 203, the audio modules 247a and 247b, and the camera modules 249a and 249b of FIGS. 2A and 2B may be wholly or partly the same as those of the display module 160, the audio module 170, and the camera module 180 of FIG. 1.

According to various embodiments, the display 203 may include a first display area A1 and a second display area A2. According to an embodiment, the first display area A1 may be disposed on the first housing 201. For example, the first display area A1 may extend substantially across at least a portion of the first surface F1 and may be disposed on the first surface F1. The second display area A2 may extend from the first display area A1 and may be inserted into or accommodated in the inside of the second housing 202 (e.g., a structure) according to the sliding of the first housing 201, or may be exposed to the outside of the second housing 202.

According to various embodiments, the second display area A2 may move while being substantially guided by an area of the first housing 201 (e.g., the curved surface 250 in FIGS. 4A and 4B) to be accommodated in the inside of the second housing 202 or in a space defined between the first housing 201 and the second housing 202 or to be exposed to the outside. According to an embodiment, the second display area A2 may be moved based on the sliding of the first housing 201 in the first direction (e.g., the direction indicated by arrow 1̂. For example, while the first housing 201 slides, a portion of the second display area A2 may be deformed into a curved shape at a position corresponding to the curved surface 250 of the first housing 201.

According to an embodiment, when viewed from above the first plate 211 (e.g., the slide plate), if the first housing 201 moves from the closed state to the opened state, the second display area A2 may define a substantially flat surface with the first display area A1 while being gradually exposed to the outside of the second housing 202. The display 203 may be coupled to or disposed adjacent to a touch detection circuit, a pressure sensor capable of measuring touch intensity (pressure), and/or a digitizer configured to detect a magnetic-field-type stylus pen. The second display area A2 may be at least partially accommodated in the inside of the second housing 202, and even in the state (e.g., the closed state) illustrated in FIG. 2A, a portion of the second display area A2 may be visually exposed to the outside. According to an embodiment, irrespective of the closed state or the opened state, a portion of the exposed second display area A2 may be positioned on a portion (e.g., the curved surface 250 in FIGS. 4A and 4B) of the first housing, and at a position corresponding to the curved surface 250, a portion of the second display area A2 may maintain the curved shape.

According to one of various embodiments, the electronic device 200 may include at least one hinge structure 240 (e.g., the hinge structure 240 in FIGS. 3A and 3B). The hinge structure 240 may connect the first housing 201 and the second housing 202 to each other. For example, the hinge structure 240 may be connected to the first plate 211 and the second plate 221. According to an embodiment, the hinge structure 240 may transmit a driving force for guiding the sliding of the first housing 201 to the first housing 201. For example, the hinge structure 240 may include an elastic material (e.g., a spring), and may provide an elastic force in the first direction (e.g., the direction in FIG. 2B) based on the sliding of the first housing 201. In other embodiments of the disclosure, the hinge structure 240 may be excluded.

According to various embodiments, the key input devices 241 may be positioned in an area of the first housing 201. Depending on the external appearance and use state, the electronic device 101 may be designed such that the illustrated key input devices 241 are omitted or an additional key input device(s) is(are) included. According to an embodiment, the electronic device 101 may include a key input device (not illustrated), such as a home key button or a touch pad disposed around the home key button. According to another embodiment, at least some of the key input devices 241 may be disposed on the $(2\text{-}1)^{th}$ sidewall 221a, the $(2\text{-}2)^{th}$ sidewall 221b, or the $(2\text{-}3)^{th}$ sidewall 221c of the second housing 202.

According to various embodiments, the connector hole 243 may accommodate a connector (e.g., a USB connector) for transmitting and receiving power and/or data to and from an external electronic device. Although not illustrated, the electronic device 101 may include a plurality of connector holes 243, and some of the connector holes 243 may function as connector holes for transmitting and receiving audio signals to and from an external electronic device. In the illustrated embodiment, the connector hole 243 is disposed in the $(2\text{-}3)^{th}$ sidewall 221c, but the disclosure is not limited thereto. The connector hole 243 or another connector hole (not illustrated) may be disposed in the $(2\text{-}1)^{th}$ sidewall 221a or the $(2\text{-}2)^{th}$ sidewall 221b. In other embodiments, the connector hole may be omitted.

According to various embodiments, the audio modules 247a and 247b may include at least one speaker hole 247a or at least one microphone hole 247b. One speaker hole 247a may be provided as a receiver hole for a voice call, and another one may be provided as an external speaker hole. The electronic device 101 may include a microphone configured to acquire sound, and the microphone may acquire sound outside the electronic device 101 through the microphone hole 247b. According to an embodiment, the electronic device 101 may include a plurality of microphones to detect the direction of sound. According to an embodiment, the electronic device 101 may include an audio module in which the speaker hole 247a and the microphone hole 247b are implemented as a single hole, or a speaker in which the speaker hole 247a is excluded (e.g., a piezo speaker).

According to various embodiments, the camera modules 249a and 249b may include a first camera module 249a and a second camera module 249b. The second camera module 249b may be positioned in the first housing 201 and may image a subject in a direction opposite to the first display area A1 of the display 203. The electronic device 101 may include a plurality of camera modules 249a and 249b. For example, the electronic device 101 may include at least one of a wide-angle camera, a telephoto camera, and a close-up camera. According to an embodiment, the electronic device 200 may include an infrared projector and/or an infrared receiver to measure the distance to the subject. The camera modules 249a and 249b may include one or more lenses, image sensors, and/or image signal processors. The first camera module 249a may be disposed to face the same direction as the display 203. For example, the first camera module 249a may be disposed around the first display area A1 or in an area overlapping the display 203, and when disposed in the area overlapping the display 203, the first camera module 249a may image a subject through the display 203.

An indicator (not illustrated) of the electronic device 101 may be disposed on the first housing 201 or the second housing 202, and may provide state information of the electronic device 101 as a visual signal by including a light-emitting diode. A sensor module (not illustrated) of the electronic device 101 may generate an electrical signal or a data value corresponding to an internal operating state of the electronic device 101 or an external environmental state. The sensor module may include, for example, a proximity sensor, a fingerprint sensor, or a biometric sensor (e.g., an iris/face recognition sensor or a heart rate monitor (HRM) sensor). According to another embodiment, the sensor module may further include at least one of, for example, a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 4A:
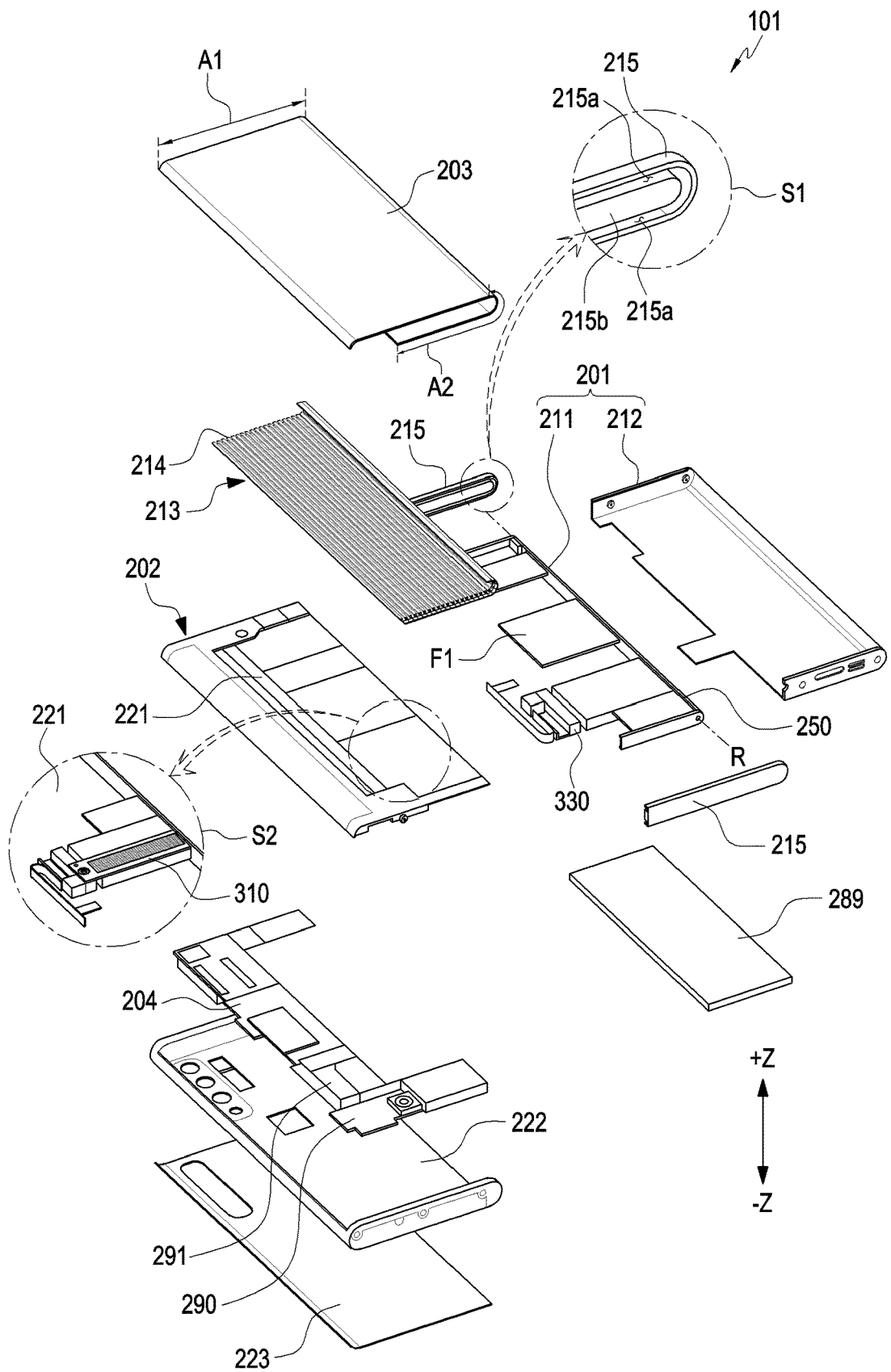
FIGS. 4A and 4B are exploded perspective views of an electronic device according to various embodiments of the disclosure.
Figure 4B:
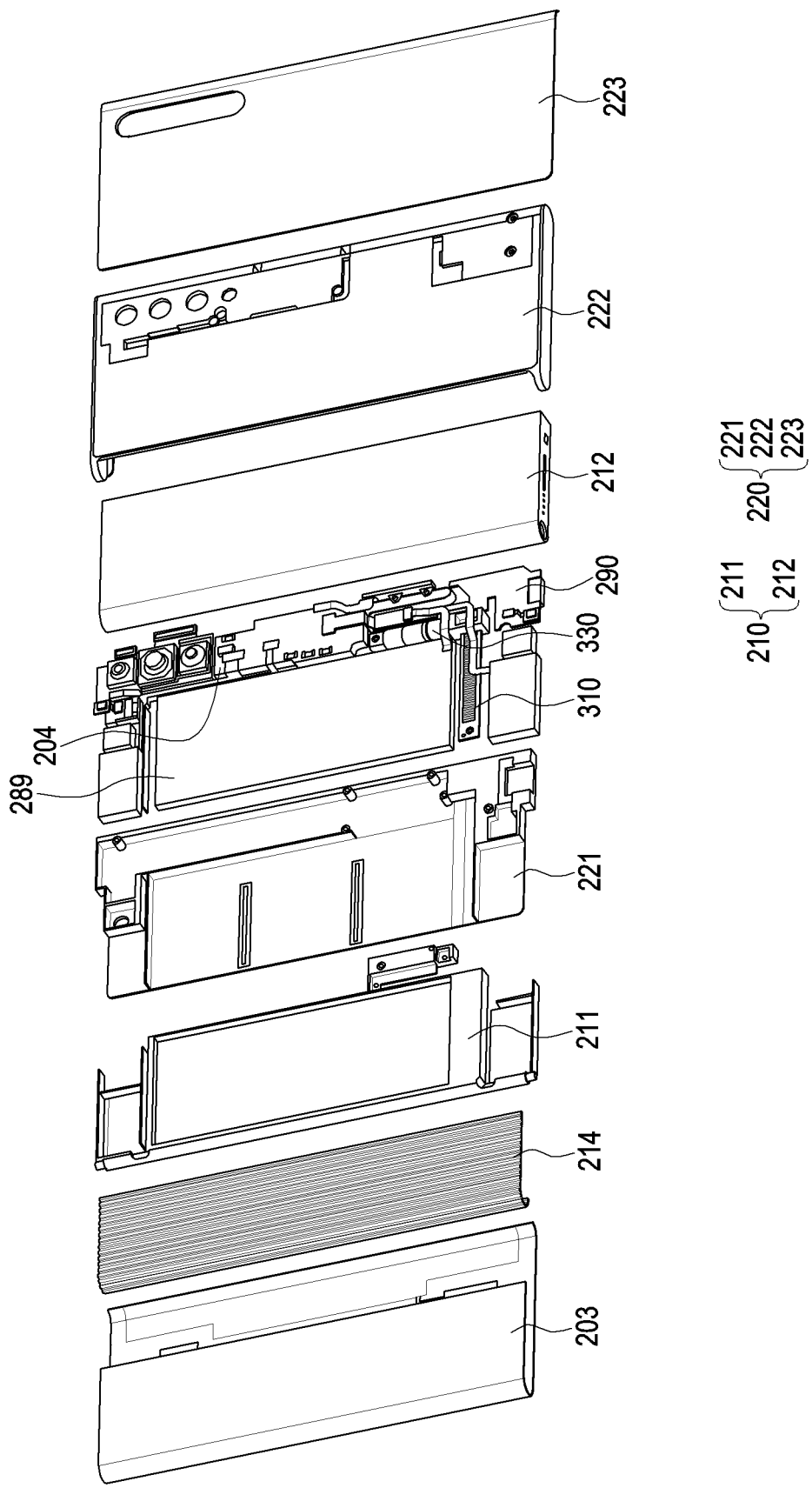

FIGS. 4A and 4B are exploded perspective views of an electronic device according to various embodiments of the disclosure.

Referring to FIGS. 4A and 4B, the electronic device 101 may include a first housing 201, a second housing 202, a display 203 (e.g., a flexible display, a foldable display, or a rollable display), and an articulated hinge structure 213. A portion of the display 203 (e.g., the second display area A2) may be accommodated in the inside of the electronic device 101 along the curved surface 250 of the first housing 201.

The configurations of the first housing 201, the second housing 202, and the display 203 of FIGS. 4A and 4B may be wholly or partly the same as those of the first housing 201, the second housing 202, and the display 203 of FIGS. 2A, 2B, 3A, and 3B.

According to various embodiments, the first housing 201 may include a first plate 211 and a slide cover 212. The first plate 211 and the slide cover 212 may be mounted on (e.g., at least partially connected to) the second housing 202, and may linearly reciprocate in a direction (e.g., the direction of the arrow 1 in FIG. 1) while being guided by the second housing 202. According to an embodiment, the first plate 211 may support the display 203. For example, the first plate 211 may include a first surface F1, and the first display area A1 of the display 203 may be substantially positioned on the first surface F1 and maintained in a flat plate shape. The slide cover 212 may protect the display 203 positioned on the first plate 211. For example, at least a portion of the display 203 may be positioned between the first plate 211 and the slide cover 212. According to an embodiment, the first plate 211 and the slide cover 212 may be formed of a metal material and/or a non-metal (e.g., polymer) material. According to an embodiment, the first plate 211 may accommodate at least some of the components of the electronic device 101 (e.g., a battery 289 such as the battery 189 in FIG. 1, a driving motor 330, and a rack 310).

According to various embodiments, the articulated hinge structure 213 may be connected to the first housing 201. For example, the articulated hinge structure 213 may be positioned between the first plate 211 and the slide cover 212. According to an embodiment, when the first housing 201 slides, the articulated hinge structure 213 is movable relative to the second housing 202. In the closed state (e.g., FIG. 2A), most of the articulated hinge structure 213 may be accommodated in the inside of the second housing 202. According to an embodiment, at least a portion of the articulated hinge structure 213 may move in response to the curved surface 250 positioned at an edge of the first housing 201.

According to various embodiments, the articulated hinge structure 213 may include a plurality of bars or rods 214. The plurality of rods 214 may linearly extend to be disposed parallel to the rotation axis R of the curved surface 250, and may be arranged in a direction perpendicular to the rotation axis R (e.g., the direction in which the first housing 201 slides).

According to various embodiments, each rod 214 may turn around another adjacent rod 214 while remaining parallel to the other adjacent rods 214. According to an embodiment, as the first housing 201 slides, the plurality of rods 214 may be arranged to define a curved shape or may be arranged to define a flat shape. For example, as the first housing 201 slides, a portion of the articulated hinge structure 213 facing the curved surface 250 may define a curved surface, and another portion of the articulated hinge structure 213 that does not face the curved surface 250 may define a flat surface. According to an embodiment, the second display area A2 of the display 203 may be mounted or supported on the articulated hinge structure 213, and in the opened state (e.g., FIG. 2B), at least a portion of the second display area A2 may be exposed to the outside of the second housing 202 together with the first display area A1. While the second display area A2 is exposed to the outside of the second housing 202, the articulated hinge structure 213 may support or maintain the second display area A2 in the flat state by defining a substantially flat surface. According to an embodiment, the articulated hinge structure 213 may be replaced with a bendable integrated support member (not illustrated).

According to various embodiments, the guide rail 215 may guide the movement of the plurality of rods 214. The guide rail 215 may include an upper end guide rail coupled to the upper end of the first plate 211 and connected to the upper end portions of the plurality of rods 214, and a lower end guide rail coupled to the lower end of the first plate 211 and connected to the lower end portions of the plurality of rods 214. According to an embodiment, referring to the first enlarged area S1, when the plurality of rods 214 are bent or slid while moving on the curved surface 250, the upper end portions and/or the lower end portions of the plurality of rods 214 are movable while maintaining the state of being fitted and coupled to the guide rail 215. For example, the upper end portions and/or the lower end portions of the plurality of rods 214 may slide, in the state of being fitted to a groove-shaped rail 215a provided inside the guide rail 215, along the rail 215a.

According to an embodiment, the driving motor 330 may be disposed in the first housing 201. By the driving of the driving motor 330 (e.g., the driving for slide-out of the display), the first plate 211 on which the driving motor 330 is disposed slides out, and a protrusion 215b provided inside the guide rail 215 may push the upper end portions and/or the lower end portions of the plurality of rods 214 which are bent. Accordingly, the display 203 accommodated between the first plate 211 and the slide cover 212 may be expanded to the front surface. According to an embodiment, by the driving of the driving motor 330 (e.g., the driving for slide-in of the display), the first plate 211 on which the driving motor 330 is disposed slides in, and an outer portion of the guide rail 215 (e.g., the portion other than the protrusion 215b) may push the upper end portions and/or the lower end portions of the plurality of rods 214 which are bent. Accordingly, the expanded display 203 may be accommodated between the first plate 211 and the slide cover 212.

According to an embodiment, the rack 310 may be disposed in the second housing 202, and may guide the sliding of the first housing 201 and the display 203. The second enlarged area S2 represents the rear surface (e.g., the surface oriented in the −Z-axis direction) of the second plate 221. Referring to the second enlarged area S2, the rack 310 is fixedly disposed on one surface (e.g., the surface oriented in the −Z-axis direction) of the second plate 221 of the second housing 202, and may guide a gear connected to the driving motor 330 to move in the sliding direction while rotating. According to various embodiments, the second housing 202 may include a second plate 221, a second plate cover 222, and a third plate 223. The second plate 221 may support the electronic device 101 as a whole. The second plate 221 may include one surface on which the first plate 211 is disposed and the other surface to which the printed circuit board 204 is coupled. According to an embodiment, the second plate 221 may receive components of the electronic device 101 (e.g., the battery 289 or the circuit board 204). The third plate cover 222 may protect various components positioned on the second plate 221.

According to various embodiments, a plurality of boards may be accommodated in the second housing 202. The circuit board 204 may be the main board, and a processor, a memory, and/or an interface may be mounted on the circuit board 204. The processor may include one or more of a central processing unit, an application processor, a graphics processing unit, an image signal processor, a sensor hub processor, or a communication processor. According to various embodiments, the circuit board 204 may include a flexible printed circuit board type radio frequency cable (FRC). For example, the circuit board 204 may be disposed on at least a portion of the second plate 221, and may be electrically connected to an antenna module (e.g., the antenna module 197 in FIG. 1) and a communication module (e.g., the communication module 190 in FIG. 1).

According to an embodiment, the memory may include a volatile memory or a nonvolatile memory.

According to an embodiment, the interface may include a high-definition multimedia interface (HDMI), a universal serial bus (USB) interface, an SD card interface, and/or an audio interface. The interface may electrically or physically connect, for example, the electronic device 101 to an external electronic device and may include a USB connector, an SD card/a multimedia card (MMC) connector, or an audio connector.

According to various embodiments, the electronic device 101 may further include a separate sub-circuit board 290 spaced apart from the circuit board 240 in the second housing 202. The sub-circuit board 290 may be electrically connected to the circuit board 240 via a flexible connection board 291. The sub-circuit board 290 may be electrically connected to the battery 289 or electrical components disposed in an end area of the electronic device 101, such as a speaker and/or a SIM socket, to transmit signals and power.

According to various embodiments, the battery 289 is a device for supplying power to at least one component of the electronic device 101 and may include a non-rechargeable primary battery, a rechargeable secondary battery, or a fuel cell. At least a portion of the battery 289 may be disposed on substantially the same plane as, for example, the circuit board 204. The battery 289 may be integrally disposed inside the electronic device 101, or may be detachably disposed on the electronic device 101.

According to an embodiment, the battery 289 may be configured as a single integrated battery or may include a plurality of separate-type batteries (e.g., a first battery 289*a* and a second battery 289*b*). For example, when the integrated battery is positioned on the first plate 211, the battery may move along with the sliding of the first plate 211. As another example, when the integrated battery is positioned on the second plate 221, the battery may be fixedly disposed on the second plate 221, regardless of the sliding of the first plate 211. As another example, when, of the separate-type batteries, the first battery (e.g., the first battery 289*a* in FIG. 6) is positioned on the first plate 211 and the second battery (e.g., the second battery 289*b* in FIG. 6) is fixedly positioned on the second plate 221, only the first battery 289*a* may move along with the sliding of the first plate 211.

According to various embodiments, the third plate 223 may substantially define at least a portion of the exterior of the second housing 202 or the electronic device 101. For example, the third plate 223 may be coupled to the outer surface of the second plate cover 222. According to an embodiment, the third plate 223 may be configured integrally with the second plate cover 222. According to an embodiment, the third plate 223 may provide a decorative effect on the exterior of the electronic device 101. The second plate 221 and the support plate cover 222 may be manufactured using at least one of a metal or a polymer, and the third plate 223 may be manufactured using at least one of a metal, glass, a synthetic resin, or ceramic. According to an embodiment, the second plate 221, the second plate cover 222, and/or the third plate 223 may be made of a material that transmits light at least partially (e.g., in an auxiliary display area). For example, while a portion of the display 203 (e.g., the second display area A2) is accommodated in the inside of the electronic device 101, the electronic device 101 may output visual information using the second display area A2. The auxiliary display area may be a portion of the second plate 221, the second plate cover 222 and/or the third plate 223 in which the display 203 accommodated in the inside of the second housing 202 is positioned.

Hereinafter, the specific configurations and operations of the rack 310 and the driving motor 330 will be described.

Figure 5:
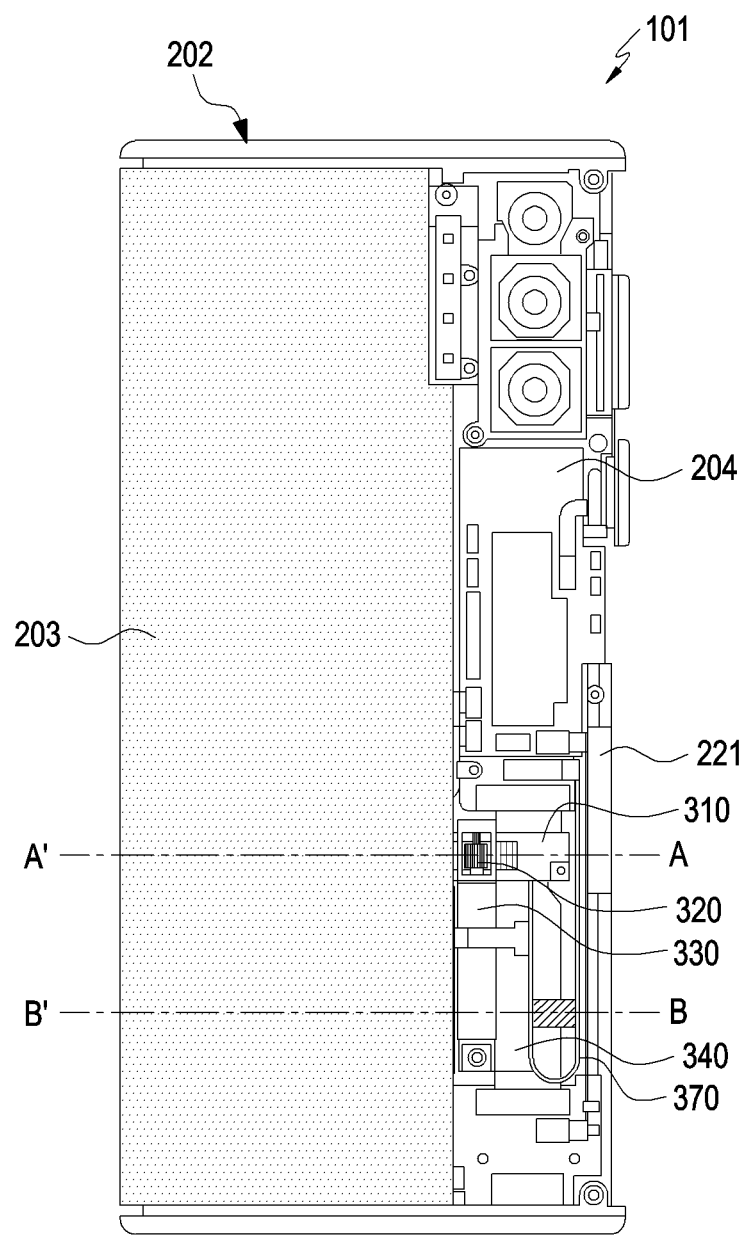
FIG. 5 is a rear view illustrating a structure in which a portion of a cover of a second housing is excluded in a state in which the electronic device is closed, according to an embodiment of the disclosure.

FIG. 5 is a rear view illustrating a structure in which a portion of a cover of a second housing is excluded in a state in which the electronic device is closed, according to an embodiment of the disclosure.

Figure 6:
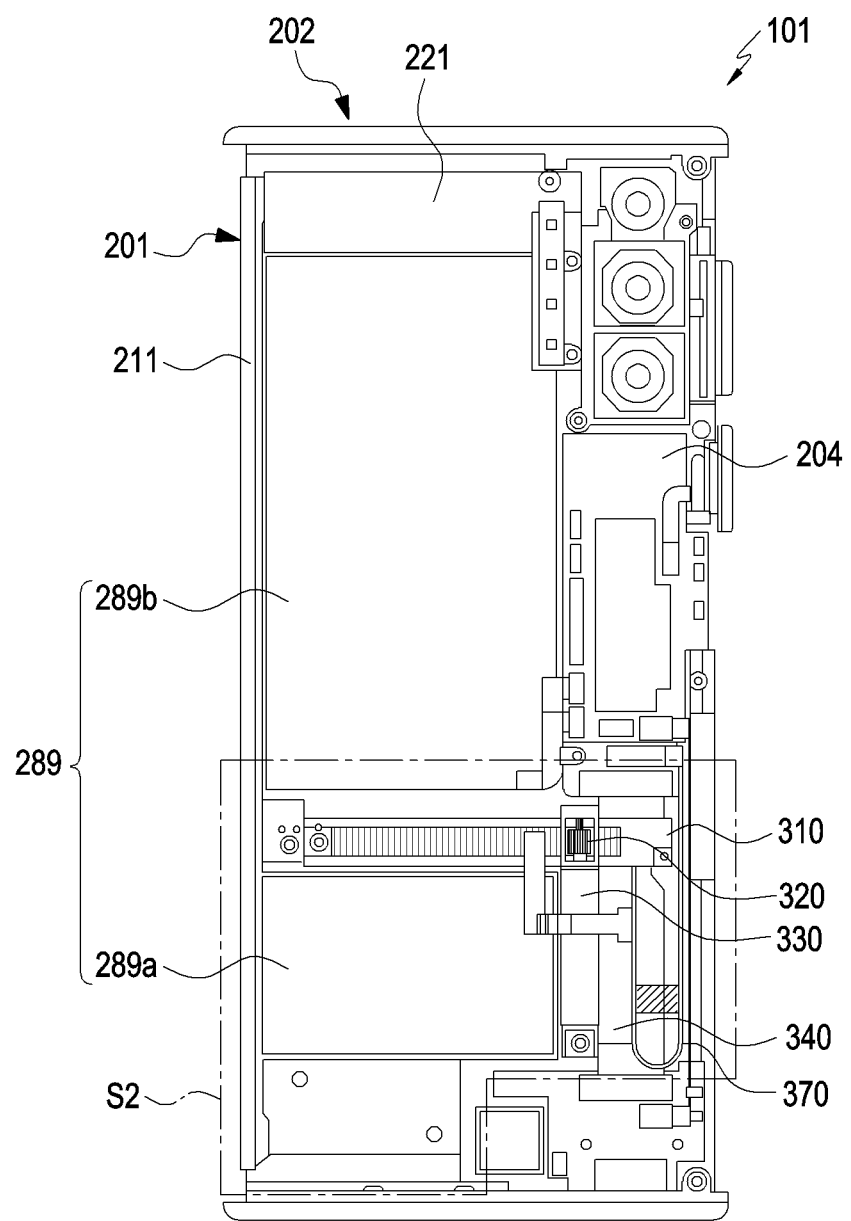
FIG. 6 is a rear view illustrating a structure in which a portion of the cover of the second housing and a portion of a display are excluded in a state in which the electronic device is closed, according to an embodiment of the disclosure.

FIG. 6 is a rear view illustrating a structure in which a portion of the cover of the second housing and a portion a display are excluded in a state in which the electronic device is closed, according to an embodiment of the disclosure.

Figure 7A:
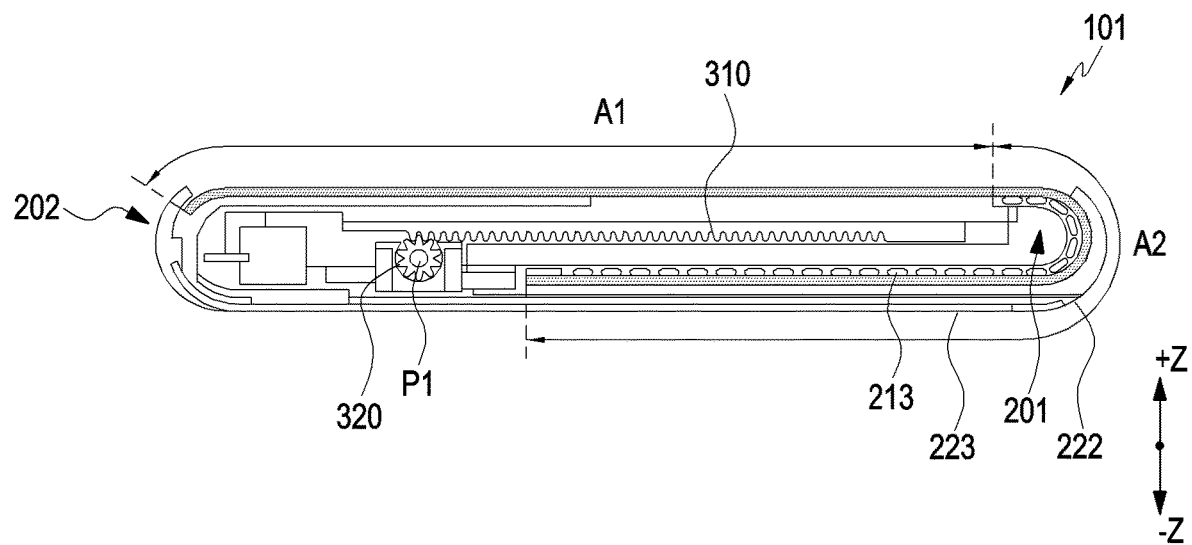
FIG. 7A is a cross-sectional view taken along line A-A' in FIG. 5, according to an embodiment of the disclosure.

FIG. 7A is a cross-sectional view taken along line A-A' in FIG. 5, according to an embodiment of the disclosure.

Figure 7B:
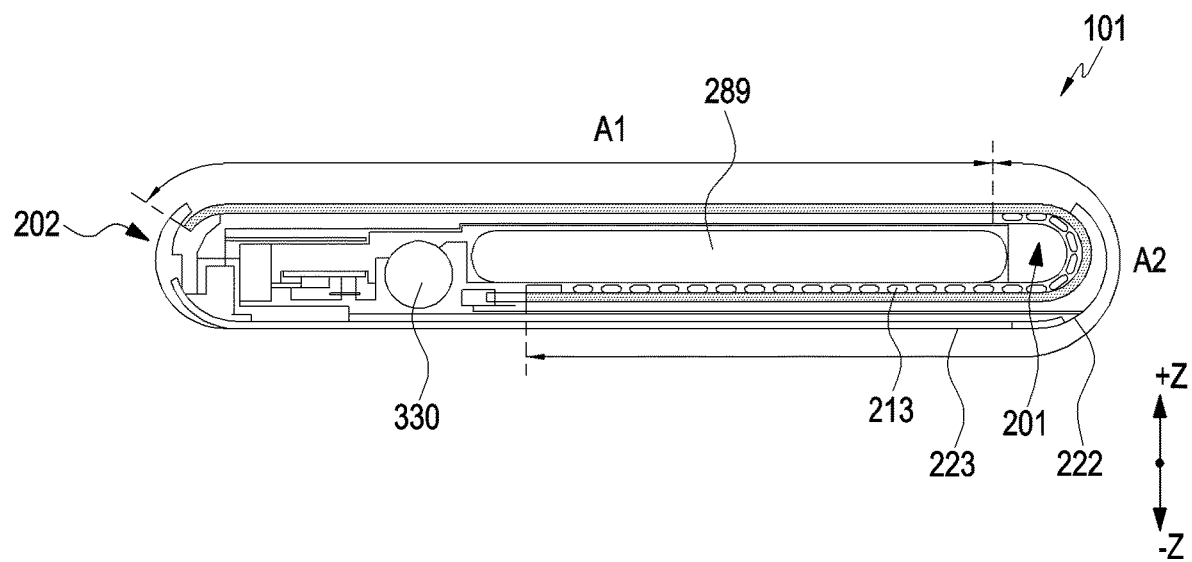
FIG. 7B is a cross-sectional view taken along line B-B' in FIG. 5, according to an embodiment of the disclosure.

FIG. 7B is a cross-sectional view taken along line B-B' in FIG. 5, according to an embodiment of the disclosure.

Figure 8:
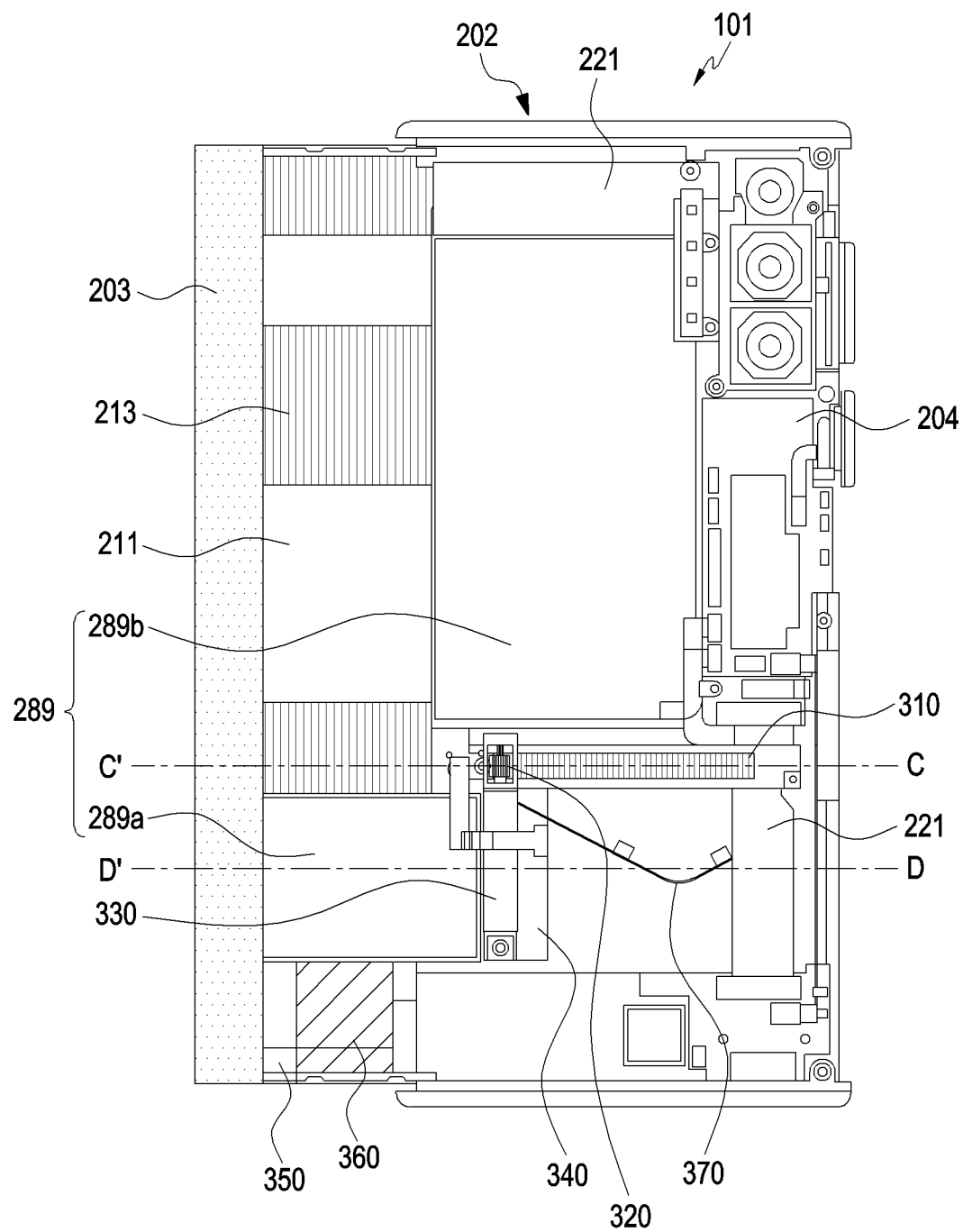
FIG. 8 is a rear view illustrating a structure in which a portion of a cover of a second housing is excluded in a state in which the electronic device is opened, according to an embodiment of the disclosure.

FIG. 8 is a rear view illustrating a structure in which a portion of a cover of a second housing is excluded in a state in which the electronic device is opened, according to an embodiment of the disclosure.

Figure 9:
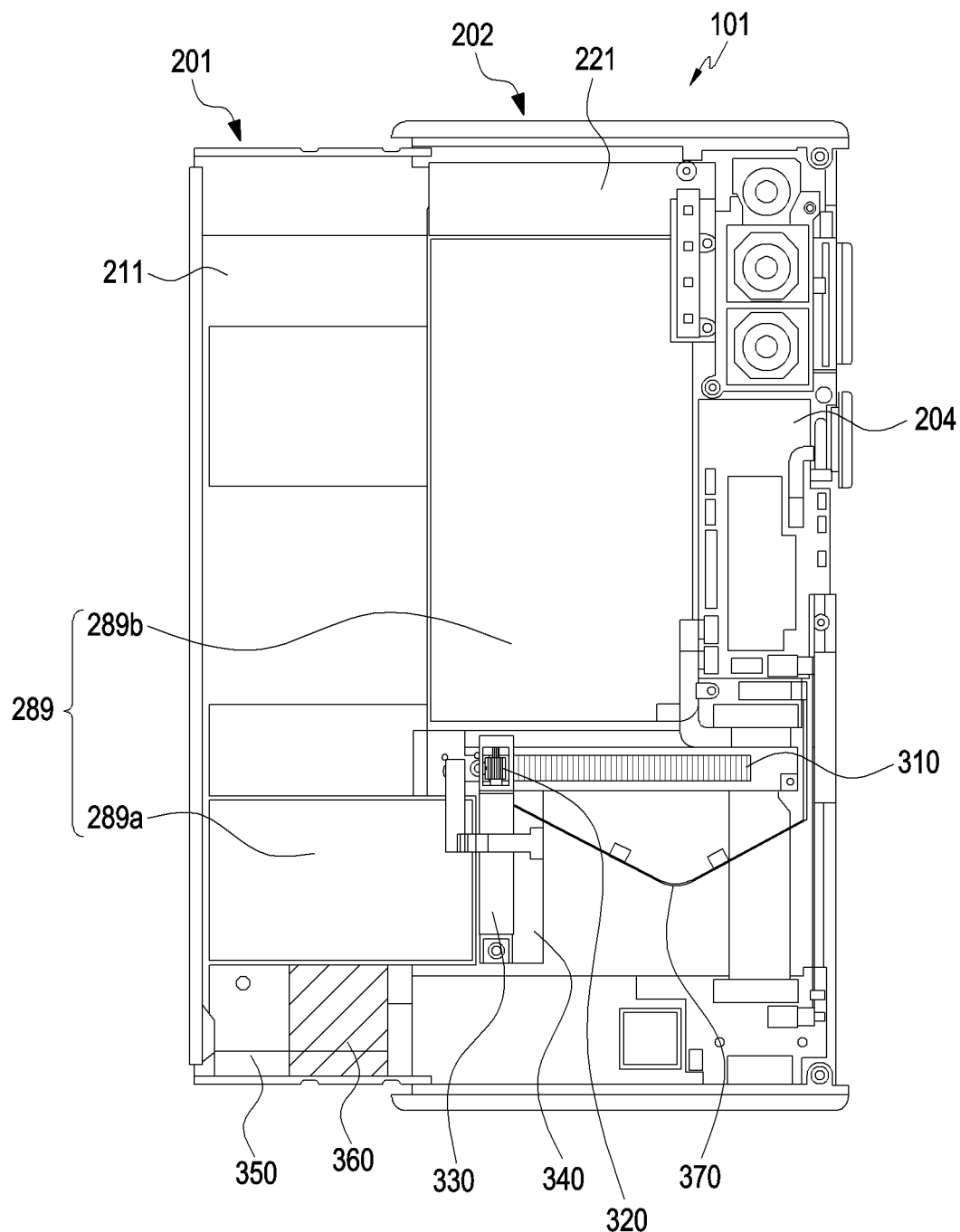
FIG. 9 is a rear view illustrating a structure in which a portion of the cover of the second housing and a portion of a display are excluded in a state in which the electronic device is opened, according to an embodiment of the disclosure.

FIG. 9 is a rear view illustrating a structure in which a portion of the cover of the second housing and a portion of a display are excluded in a state in which the electronic device is opened, according to an embodiment of the disclosure.

FIG. 10A is a cross-sectional view taken along line C-C' in FIG. 8, according to an embodiment of the disclosure.

FIG. 10B is a cross-sectional view taken along line D-D' in FIG. 8, according to an embodiment of the disclosure.

FIGS. 5, 6, 8, and 9 are projection views in each of which a rear cover (e.g., the third plate 223 in FIGS. 4A and 4B) is excluded of the external portion of the electronic device so that internal components are exposed.

According to various embodiments, the electronic device 101 may include a first housing 201, a second housing 202, a circuit board 204, a display 203, and a driving structure. The electronic device 101 may further include various components (e.g., a camera module and a battery) disposed in the first housing 201 or the second housing 202.

The configurations of the first housing 201 and the second housing 202 of FIGS. 5, 6, 7A, 7B, 8, 9, 10A, and 10B may be wholly or partly the same as those of the first housing 201 and the second housing 202 of FIGS. 2A, 2B, 3A, 3B, 4A, and 4B.

According to various embodiments, as the first housing 201 (and the flexible display 203 connected to the first housing 201) slides in or out relative to the second housing 202, the electronic device may be in the closed state or the opened state.

According to various embodiments, the electronic device 101 may include a driving structure for automatically or semi-automatically providing the slide in/out operation of the display 203. For example, when the user pushes an open trigger button (e.g., the key input device 241 of FIG. 2A) exposed to the outside of the electronic device 101, the display 203 may automatically slide in or out (automatic operation). As another example, when the user pushes the display 203 of the electronic device 101 to slide out up to a predetermined section, the remaining section may completely slide out by the force of an elastic member mounted in the electronic device 101 (semi-automatic operation). The slide-in operation of the electronic device 101 may also be performed to correspond to the slide-out operation (semi-automatic operation).

Referring to FIG. 5, the driving structure may include a driving motor 330, a gear 320 mounted at an end of the driving motor 330, a rack 310, and a connection board 340 electrically connected to the driving motor 330.

According to an embodiment, the driving motor 330 may be disposed in the first housing 201 to be slidable relative to the second housing 202. The driving motor 330 may transmit a driving force to the gear 320 connected to the end.

According to an embodiment, the driving motor 330 may be disposed not to overlap the second display area A2 of the display 203. For example, the shaft P1 of the driving motor 330 may be disposed to be perpendicular to the sliding direction, and one surface of the driving motor 330 that is oriented in the +Z-axis direction overlaps the first display area A1, but one surface that is oriented in the −Z-axis direction may be disposed not to overlap the second display area A2 regardless of the slide-in/out of the display 203. The one surface of the driving motor 330 that is oriented in the −Z axis direction may face the first housing 201 in the slide-in state of the display 203, and may face the second housing 202 in the slide-out state of the display 203.

In the arrangement of the driving motor 330 according to various embodiments of the disclosure, since the driving motor 330 is not positioned between the portions of the display 203 (e.g., not overlapping the second display area A2), it is possible to increase the diameter of the driving motor 330. The diameter of the driving motor 330 is directly associated with the performance (e.g., thrust) of the motor, and the increased diameter of the driving motor 330 according to various embodiments of the disclosure may improve the performance of the motor. For example, in consideration of the repulsive force of the flexible display, the driving motor 330 requires to exhibit a force of at least about 3 kgf, and the force may be possible when the diameter of the driving motor 330 is about 6.2T (mm) or more. The electronic device 101 according to an embodiment of the disclosure may include a driving motor 330 having a thickness of about 6.2T to 6.7T. According to another embodiment, in consideration of the total thickness of the electronic device 101, the diameter of the driving motor 330 may be designed to be about 0.62% to 0.68% of the total thickness.

According to an embodiment, the driving motor 330 may be disposed in parallel with at least a portion of the battery 289 and may be electrically connected to the connection board 340 disposed adjacent thereto.

According to an embodiment, the rack 310 may be disposed in the second housing 202, and may guide the sliding of the first housing 201 and the display 203. The rack 310 may be fixed one surface (e.g., the one surface oriented in the −Z-axis direction) of the second plate 221 of the second housing 202, and may guide the gear 320 to move in the sliding direction to move while rotating. At least a portion of one surface of the rack 310 that is oriented in the −Z-axis direction may face the second display area A2 in the slide-in state of the display 203, and may not face the second display area A2 in the slide-out state of the display 203.

According to an embodiment, the rack 310 may be disposed not to overlap the battery 289. For example, when the separate-type batteries 289 (the first battery 289a and the second battery 289b) may be disposed in the electronic device 101, and the rack 310 may be positioned between the first battery 289a and the second battery 289b when viewed from the rear side.

According to an embodiment, the gear 320 may be positioned on the shaft P1 of the driving motor 330 and may cause the first housing 201 and the display 203 to slide while rotationally moving along the rack 310. When the first housing 201 slides due to rotation of the gear 320, an electrical component (hereinafter referred to as a first electrical component) mounted in the first housing 201 may also slide. For example, the first electrical component may be at least one of the driving motor 330, components disposed on the connection board 340, the speaker 360, and the SIM socket 350. As another example, the first electrical component may be the battery 289. In the case of separate-type batteries, the first electrical component may be at least one of the separate-type batteries (e.g., the first battery 289a).

According to an embodiment, the connection board 340 may be disposed adjacent to the driving motor 330 and/or the rack 310 in the first housing 201. The connection board 340 may be configured to be electrically connected to the main circuit board 204 disposed in the second housing 202. An electrical structure (e.g., a processor) may be mounted on the main circuit board 204 to control the driving of the driving motor 330 or to provide power to the driving motor 330. The connection board 340 may be electrically connected to the main circuit board 204 to transmit a signal for controlling driving of the driving motor 330 or for controlling power. According to an embodiment, the connection board 340 and the main circuit board 204 may be rigid boards, and the electronic device 101 may further include a separate connection FPCB 370 for connecting the connection board 340 and the main circuit board 204 to each other. According to an embodiment of the disclosure, power from a separate battery (e.g., the first battery 289a) disposed adjacent to the driving motor 330 may directly provide power via the connection board 340.

According to an embodiment, the connection board 340 connected to the motor 330 may be disposed in the first housing 201, and may move along with the sliding of the first housing 210. A main circuit board 204 and a sub-circuit board 290 spaced apart from the main circuit board 204 may be disposed in the second housing 202. In addition, a flexible connection board 291 for electrically connecting the main circuit board 204 and the sub-circuit board 290 to each other may be disposed in the second housing 204. Connectors are disposed at each end of the flexible connection board 291 to form electrical contacts with the main circuit board 204 and the sub-circuit board 290, and at least a portion of the driving structure may be disposed to overlap the connection flexible board. For example, when the inside of the electronic device is viewed in a projection manner toward the rear cover (e.g., the third plate 223 in FIGS. 4A and 4B), the upper end portion of the flexible connection board 291 and a portion of the rack 310 may be disposed to overlap each other.

According to an embodiment, the battery 289 disposed in the electronic device 101 may be separate-type batteries. For example, the battery 289 may include a first battery 289a disposed in the first housing 201 to be slidable together with the first housing 201 and a second battery 289b fixed in the second housing 202.

According to an embodiment, the first battery 289a and the second battery 289b may be disposed to be spaced apart from each other. For example, in the slide-in state of the display 203 (and the first housing 201), an end of the first battery 289a and an end of the second battery 289b may be disposed to be spaced apart from each other, and the rack 310 may be positioned in the space between the ends of the first and second batteries. The areas of the ends of the first battery 289a and the second battery 289b that face each other may correspond to (e.g., equal to) each other. As another example, in the slide-out state of the display 203 (and the first housing 201), at least a portion of the end of the first battery 289a and the end of the second battery 289b may be disposed to be spaced apart from each other. Since the first battery 289a is in the slide-out state, only a portion of the end of the first battery 289a may face a portion of the end of the second battery 289b.

The above-described embodiment discloses a configuration in which the shape of the battery 289 is separated so that some batteries are slidable, but the disclosure is not limited thereto, and when the battery is provided in an integrated battery shape, the entire battery may or may not be slidable depending on the position of the integrated battery (see FIGS. 11A to 11D, 12A, and 12B).

Figure 11A:
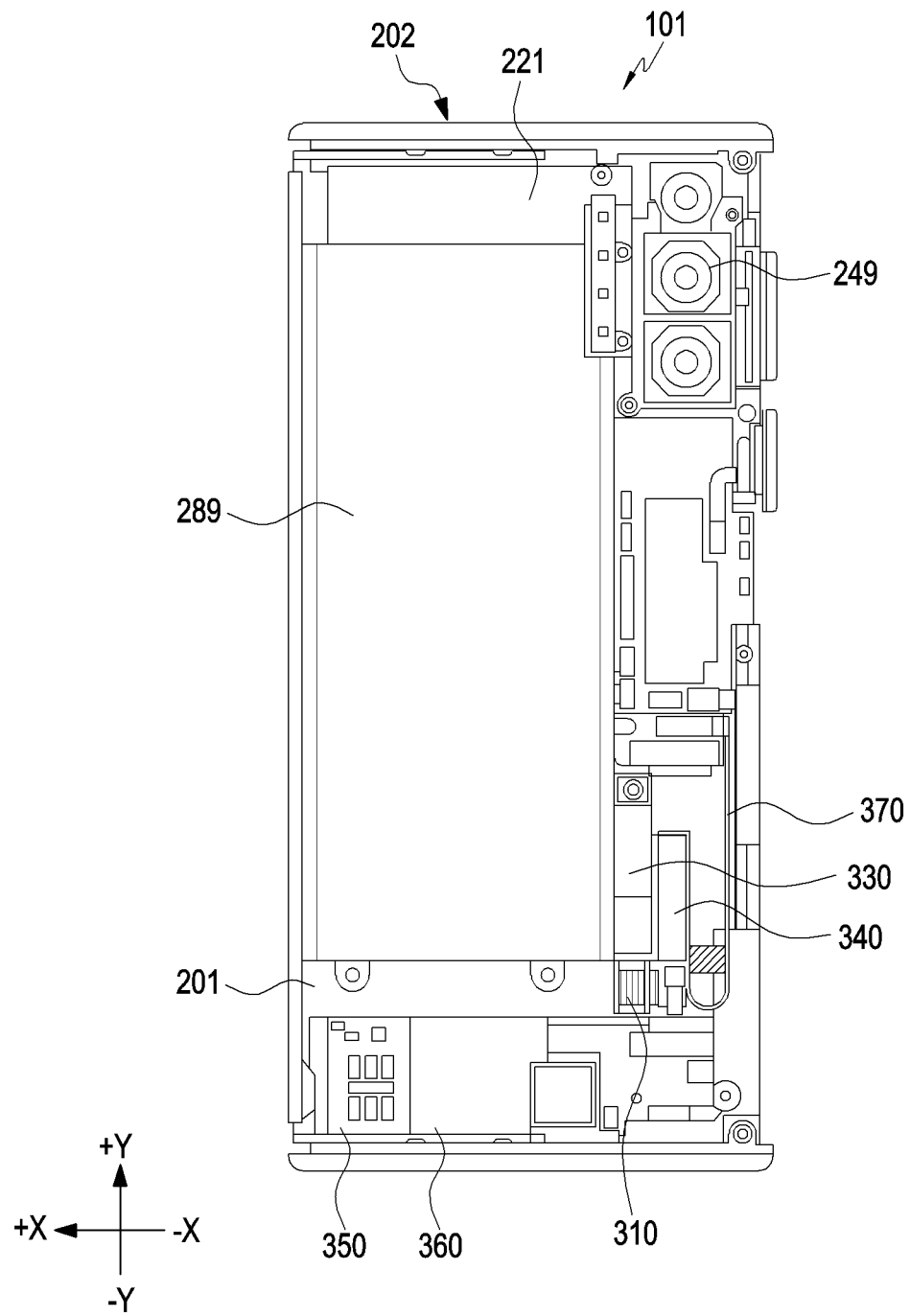
FIG. 11A is a rear view illustrating a structure in which a portion of a cover of a second housing is excluded in a state in which the electronic device is closed, according to an embodiment of the disclosure.
Figure 11B:
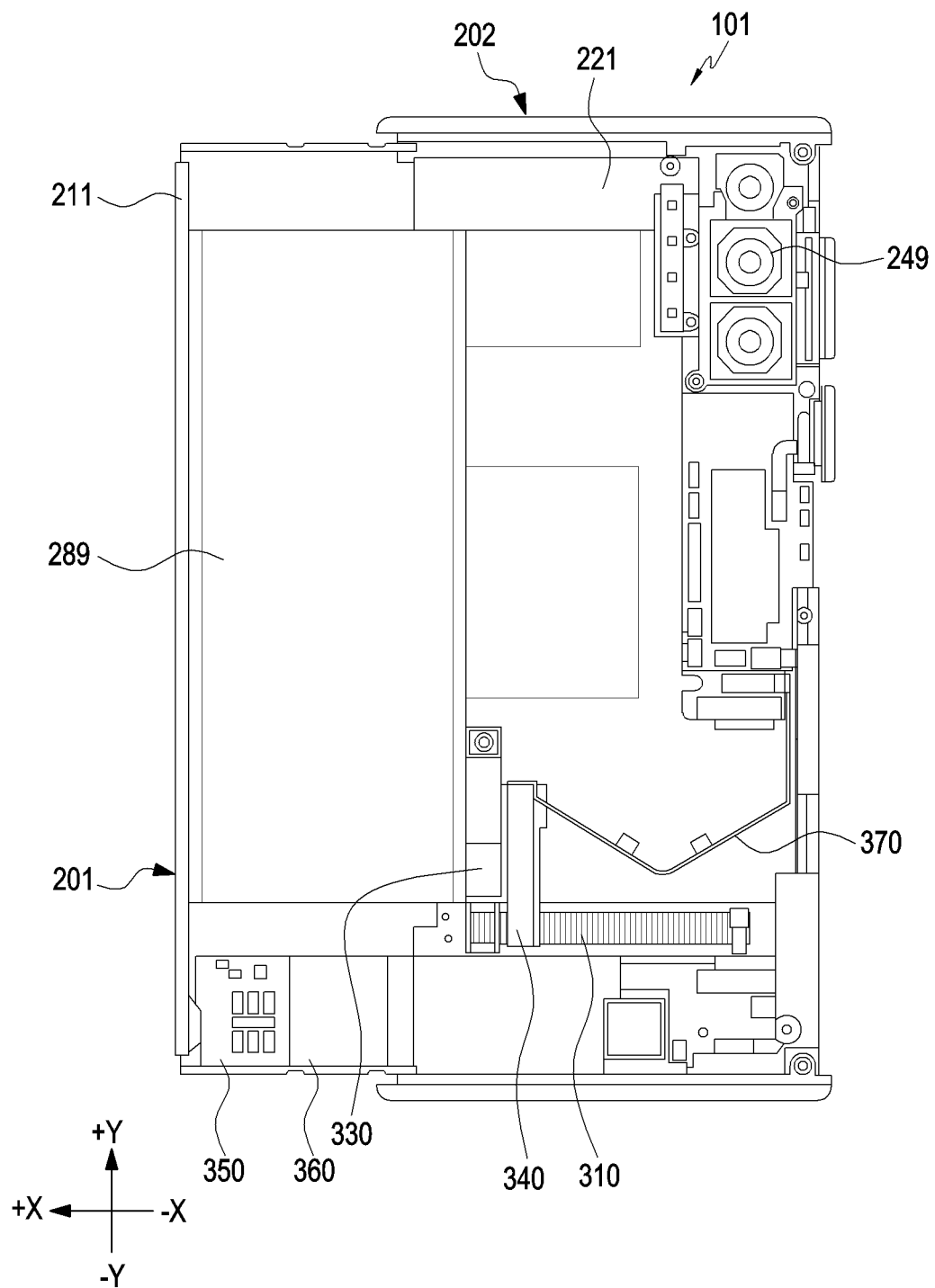
FIG. 11B is a rear view illustrating a structure in which a portion of the cover of the second housing and a display are excluded in a state in which the electronic device is opened, according to an embodiment of the disclosure.
Figure 11C:
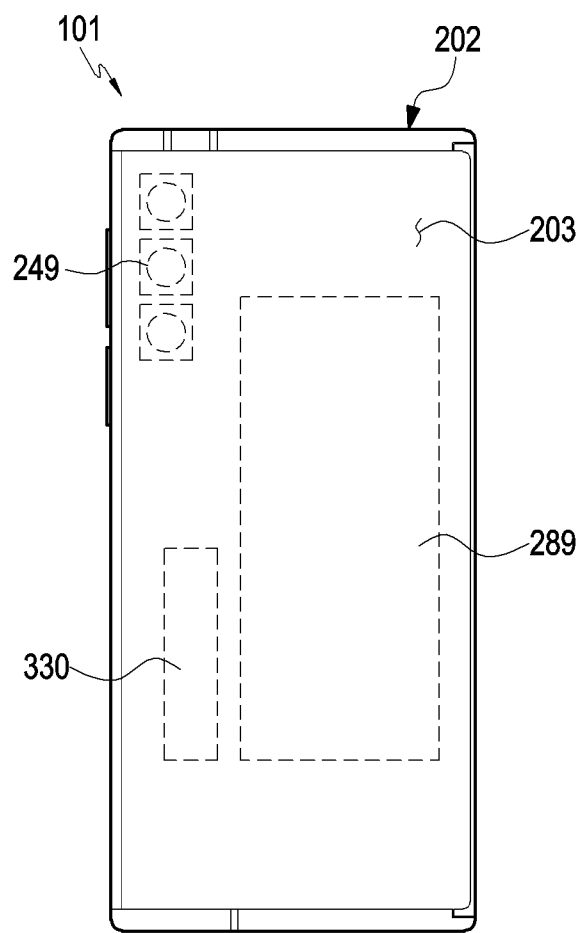
FIG. 11C is a schematic projection view illustrating positions of internal components when viewed from the front side of the electronic device in a state in which the electronic device is closed, according to an embodiment of the disclosure.
Figure 11D:
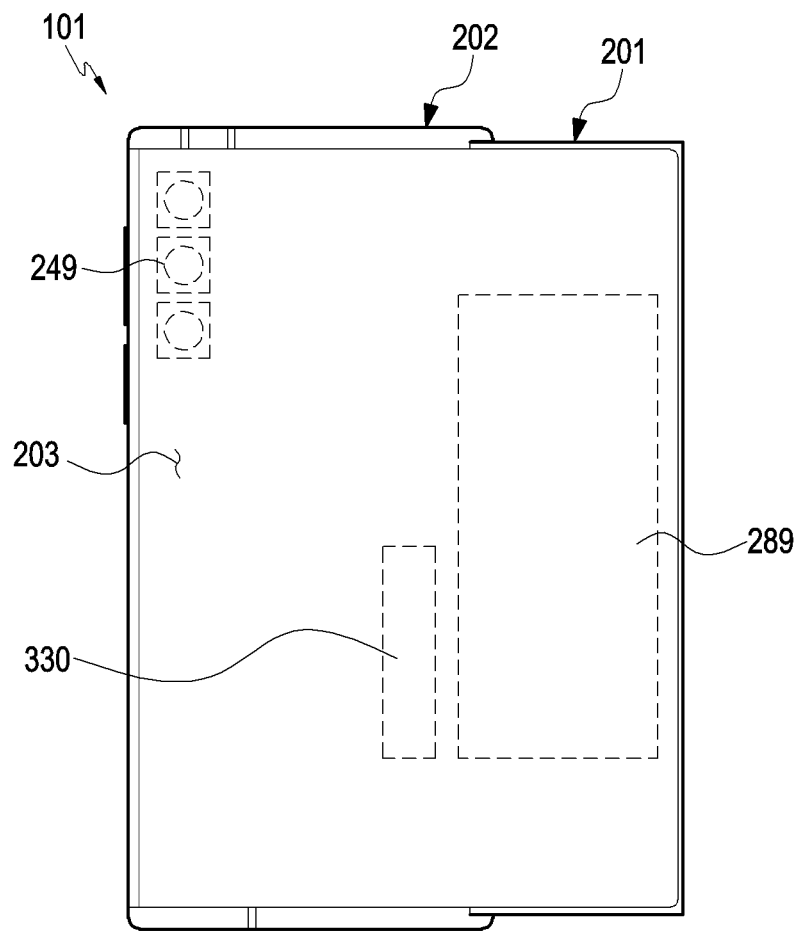
FIG. 11D is a schematic projection view illustrating positions of internal components when viewed from the front side of the electronic device in a state in which the electronic device is opened, according to an embodiment of the disclosure.

FIG. 11A is a rear view illustrating a structure in which a portion of a cover of a second housing is excluded in a state in which the electronic device is closed, according to an embodiment of the disclosure. FIG. 11B is a rear view illustrating a structure in which a portion of the cover of the second housing and a display are excluded in a state in which the electronic device is opened, according to an embodiment of the disclosure. FIG. 11C is a schematic projection view illustrating positions of internal components when viewed from the front side of the electronic device in a state in which the electronic device is closed, according to an embodiment of the disclosure. FIG. 11D is a schematic projection view illustrating positions of internal components when viewed from the front side of the electronic device in a state in which the electronic device is opened, according to an embodiment of the disclosure.

Figure 12A:
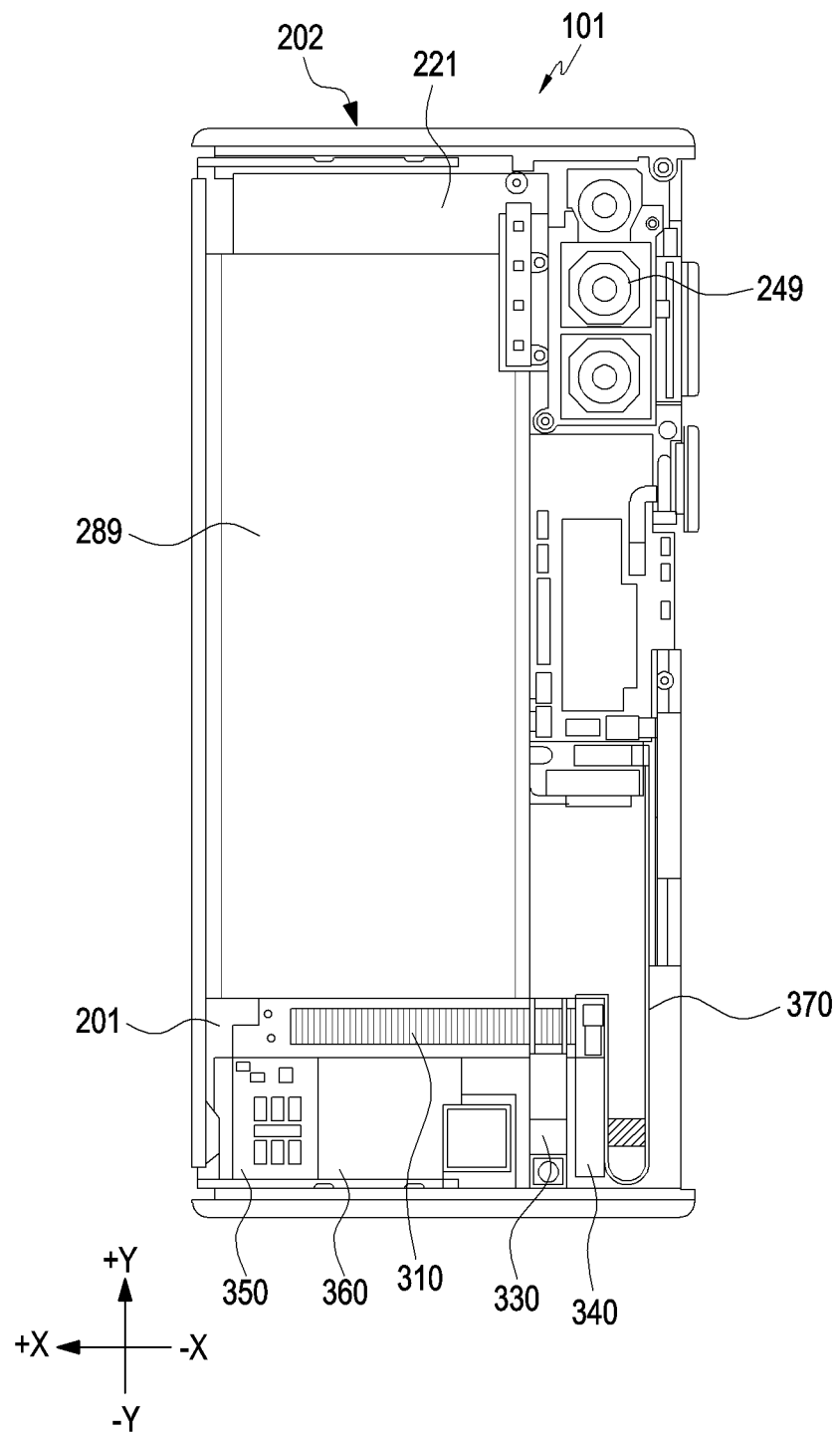
FIG. 12A is a rear view illustrating a structure in which a portion of a cover of a second housing is excluded in a state in which the electronic device is closed, according to an embodiment of the disclosure.
Figure 12B:
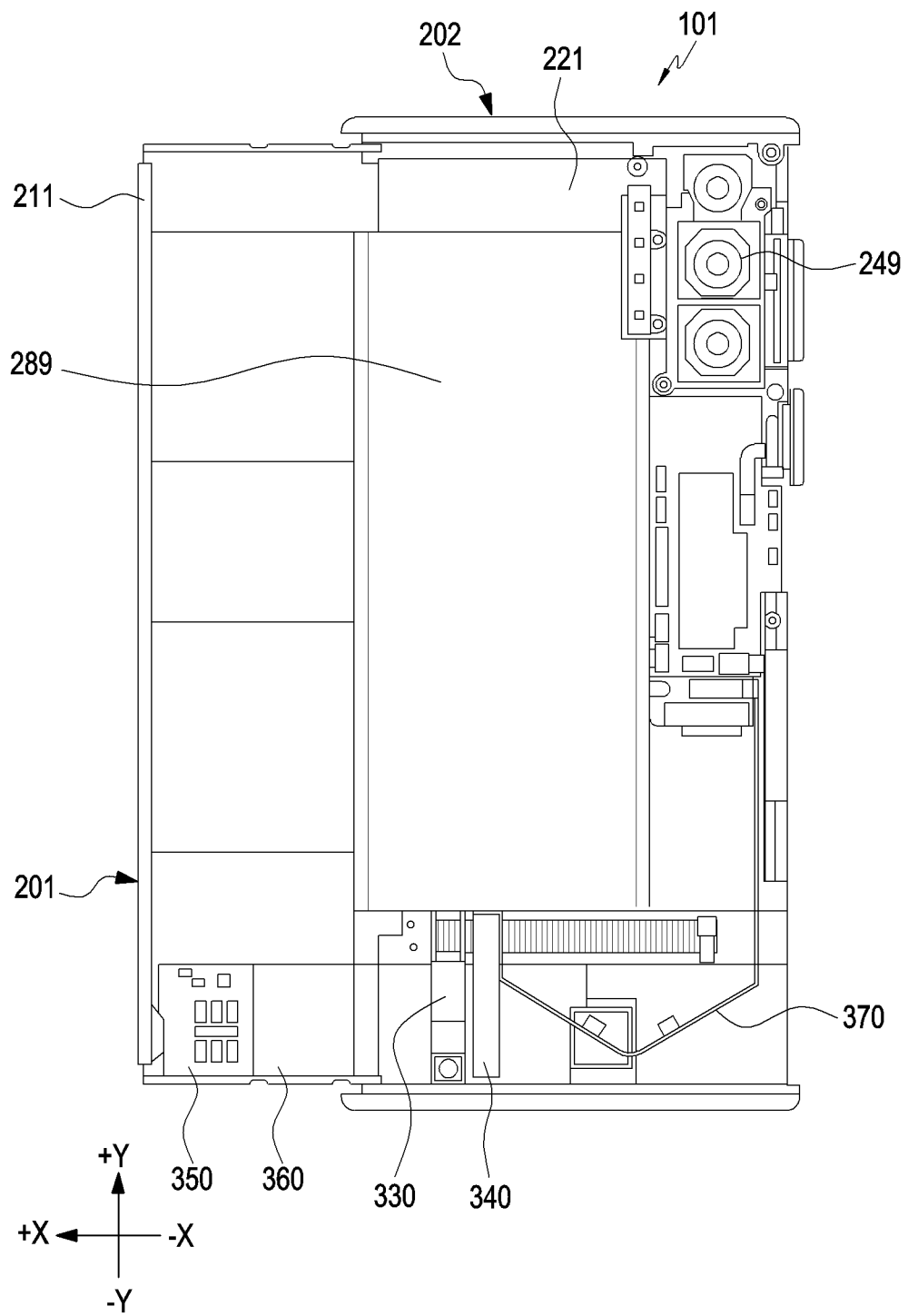
FIG. 12B is a rear view illustrating a structure in which a portion of the cover of the second housing and a display are excluded in a state in which the electronic device is closed, according to an embodiment of the disclosure.

FIG. 12A is a rear view illustrating a structure in which a portion of a cover of a second housing is excluded in a state in which the electronic device is closed, according to an embodiment of the disclosure. FIG. 12B is a rear view illustrating a structure in which a portion of the cover of the second housing and a display are excluded in a state in which the electronic device is closed, according to an embodiment of the disclosure.

FIGS. 11A to 11D, 12A, and 12B are projection views in each of which a rear cover (e.g., the third plate 223 in FIGS. 4A and 4B) is excluded from the external portion of the electronic device so that internal components are exposed.

Referring to FIGS. 11A to 11D, 12A, and 12B, the electronic device 101 may include a first housing 201, a second housing 202, a circuit board 204, and a display 203. The electronic device 101 may further include various components disposed in the first housing 201 or the second housing 202 (e.g., a camera module 249 (e.g., the camera modules 249a and 249b in FIGS. 2A, 2B, 3A, and 3B), a battery 289, a SIM socket 350, and a speaker 360).

According to an embodiment, the electronic device 101 may further include a driving structure for automatically or semi-automatically providing the slide-in/out operation of the display 203. The driving structure may include a driving motor 330, a gear 320 mounted at an end of the driving motor 330, a rack 310, and a connection board 340 electrically connected to the driving motor 330.

The first housing 201, the second housing 202, the circuit board 204, the display 203, and the driving structure of FIGS. 11A to 11D, 12A, and 12B may be wholly or partly the same as the first housing 201, the second housing 202, the circuit board 204, the display 203, and the driving structure FIGS. 5, 6, 7A, 7B, 8, 9, 10A, and 10B.

Hereinafter, a structure of a battery different from that of FIGS. 5, 6, 7A, 7B, 8, 9, 10A, and 10B will be described.

Referring to FIGS. 11A to 11D, the electronic device 101 may include a battery 289 disposed in the first housing 201. For example, the battery 289 may be mounted on one surface of the first plate 211 of the first housing 201 and may be designed as a single integrated battery. Since one surface of the battery 289 is attached in a recess provided on the rear surface of the first plate 211 as a whole, the battery 289 may slide as a whole in response to the sliding of the first housing 201.

According to various embodiments, the driving structure may be positioned at the upper end (the +Y-axis direction) or the lower end (the −Y-axis direction) of the battery 289. For example, in the slide-in state of the display 203 (and the first housing 201), the rack 310 may be disposed adjacent to the lower end of the battery 289, and the driving motor 330 and the connection board 340 may be disposed adjacent to a side of the battery 289. In the slide-out state of the display 203 (and the first housing 201), the rack 310 may only partially face the battery 289 or may not face the battery due to the sliding of the battery 289.

According to various embodiments, the electronic device 101 may include a battery 289 disposed in the second housing 202. For example, the battery 289 may be mounted on one surface of the second plate 221 of the second housing 202 and may be designed as a single integrated battery. Since one surface of the battery 289 is attached to the second plate 221 as a whole, the battery 289 may be maintained in a fixed state in the second housing 202 without sliding in response to the sliding of the first housing 201. The structure that slides in response to the sliding of the first housing 201 may be an electrical component (e.g., a camera module 249, a speaker 360, or a component such as the SIM socket 350) positioned in the first housing 201.

According to various embodiments, the driving structure may be positioned at the upper end (the +Y-axis direction) or the lower end (the −Y-axis direction) of the battery 289. For example, in the slide-in state of the display 203 (and the first housing 201), the rack 310 may be disposed adjacent to the lower end of the battery 289, and the driving motor 330 and the connection board 340 may be disposed adjacent to a side of the battery 289. Since the rack 310 and the battery 289 are configured to be fixed in the second housing 202 in the slide-out state of the display 203 (and the first housing 201), the rack 310 may be disposed adjacent to and face the lower end of the battery 289.

Figure 13:
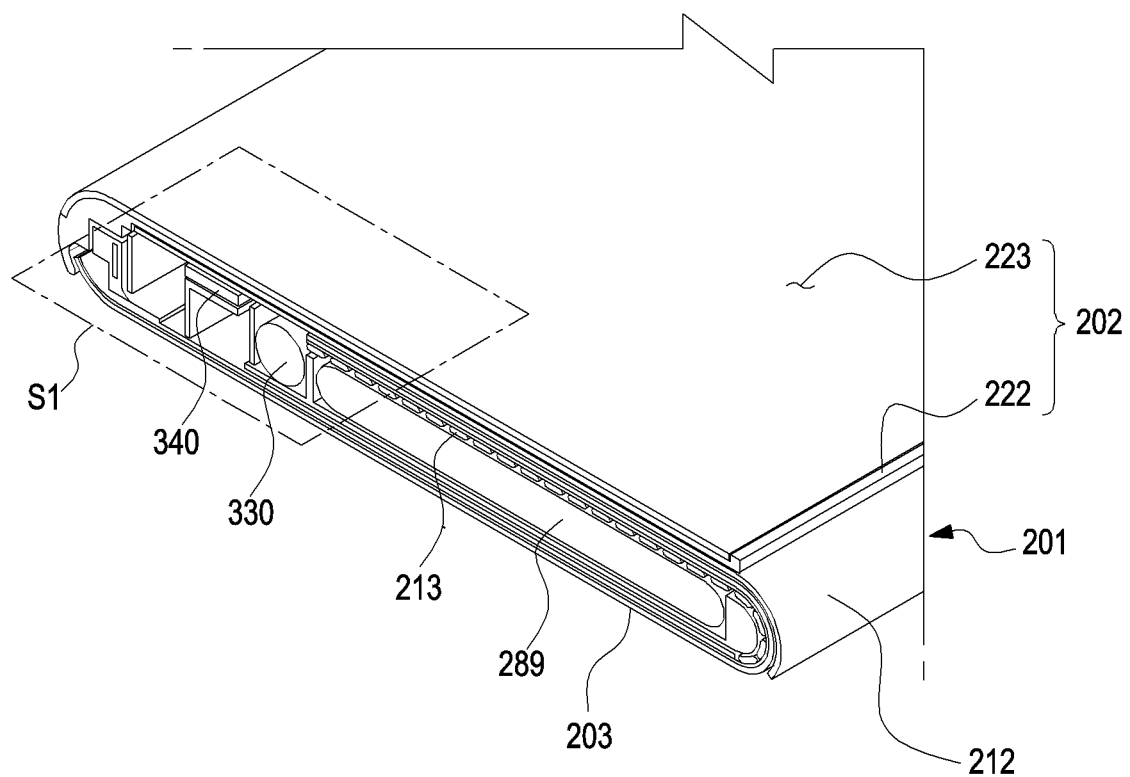
FIG. 13 is a cross-sectional perspective view illustrating a driving motor and peripheral components in a state in which the electronic device is closed, according to an embodiment of the disclosure.

FIG. 13 is a cross-sectional perspective view illustrating a driving motor and peripheral components in a state in which the electronic device is closed, according to an embodiment of the disclosure.

Figure 14:
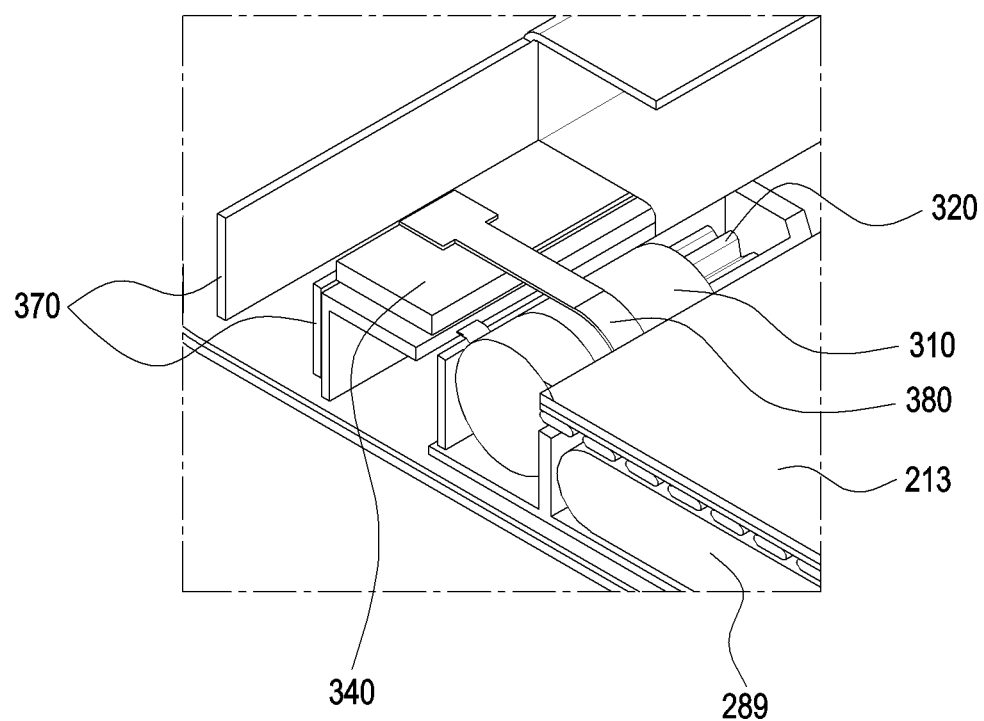
FIG. 14 is an enlarged perspective view of an area in which a portion of a cover of the second housing is excluded in FIG. 13, according to an embodiment of the disclosure.

FIG. 14 is an enlarged perspective view of an area S1 in which a portion of a cover of the second housing is excluded in FIG. 13, according to an embodiment of the disclosure.

Referring to FIGS. 13 and 14, the electronic device 101 may include a first housing 201, a second housing 202, and a display 203. The electronic device 101 may further include various components (e.g., a camera module and a battery) disposed in the first housing 201 or the second housing 202. The electronic device 101 may further include a driving structure for automatically or semi-automatically providing the slide-in/out operation of the display 203. The driving structure may include a driving motor 330, a gear 320 mounted at an end of the driving motor 330, a rack 310, and a connection board 340 electrically connected to the driving motor 330.

The configurations of the first housing 201, the second housing 202, the display 203, and the driving structure in FIGS. 13 and 14 may be wholly or partly the same as those of the first housing 201, the second housing 202, the display 203, and the driving structure in FIGS. 5, 6, 7A, 7B, 8, 9, 10A, and 10B.

According to various embodiments, the driving motor 330 may be disposed inside the first housing 201 and may be mounted not to overlap a portion of the display 203 (e.g., the second display area A2 in FIGS. 4A and 4B) provided to be mounted inside the second housing 202 when viewed from the front surface or the rear surface of the electronic device 101. For example, the driving motor 330 may be disposed to be adjacent to or spaced apart from one end of the display 203, and may expand the thickness to the front or rear surface.

According to various embodiments, the driving motor 330 may be mounted so as not to overlap an articulated hinge structure 213, which supports the display 203 when the display moves, when viewed from the front surface or rear surface.

According to various embodiments, the battery 289 may be positioned on one side of the driving motor 330, and the connection board 340 may be positioned on the other side of the driving motor 330. The connection board 340 may be mounted inside the first housing 201 and may slide together with the driving motor 330. A battery FPCB 380 for transmitting power to the battery 289 may extend from one end of the battery 289 to the connection board 340 across the driving motor 330. Connectors for electrical contacts may be disposed at one end and the other end of the battery FPCB 380.

According to various embodiments, the connection FPCB 370 may be electrically connected to one side of the connection board 340. For example, one portion (e.g., the first portion 370a in FIGS. 15 and 16) forming one side of the connection FPCB 370 may be disposed to face the driving motor, with the connection board 340 interposed therebetween. According to an embodiment, the one portion of the connection FPCB 370 is connected to the connection board 340 disposed in the first housing 201 so that the one portion can be slid. The other portion (e.g., the second portion 370b in FIGS. 15 and 16) forming the other side of the connection FPCB 370 is connected to the main board disposed in the second housing 202 so that the other portion can maintain the fixed state without sliding.

According to various embodiments, a gear 320 may be disposed on the rotation shaft of the driving motor 330. In order to prevent the rotation shaft of the driving motor 330 and the gear 320 from being shaken or to prevent foreign matter from being caught during rotation of the rotation shaft and gear 320 of the driving motor 330, a motor bracket (not illustrated) may be further disposed in the area of the rotation shaft of the driving motor 330 and the gear 320.

Figure 15:
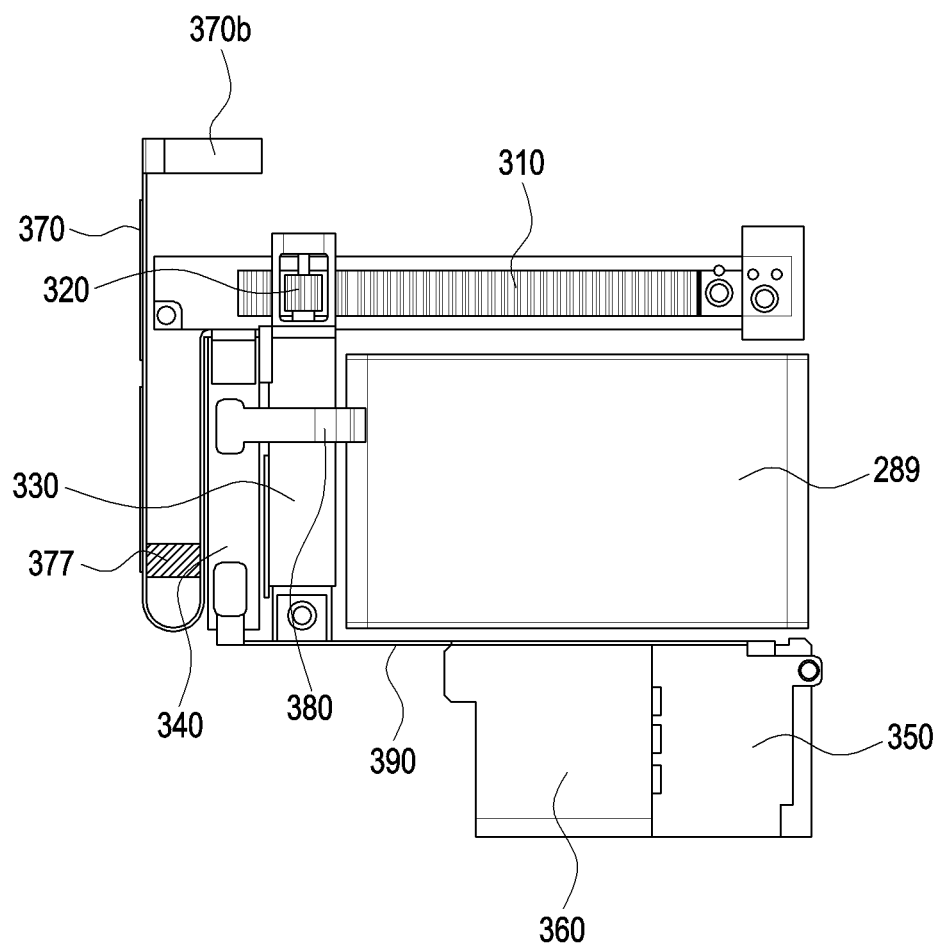
FIG. 15 is a view illustrating an area of a driving motor and peripheral components in a state in which the electronic device is closed, according to an embodiment of the disclosure.

FIG. 15 is a view illustrating an area (e.g., S2 in FIG. 6) of a driving motor and peripheral components in the state in which the electronic device is closed, according to an embodiment of the disclosure.

Figure 16:
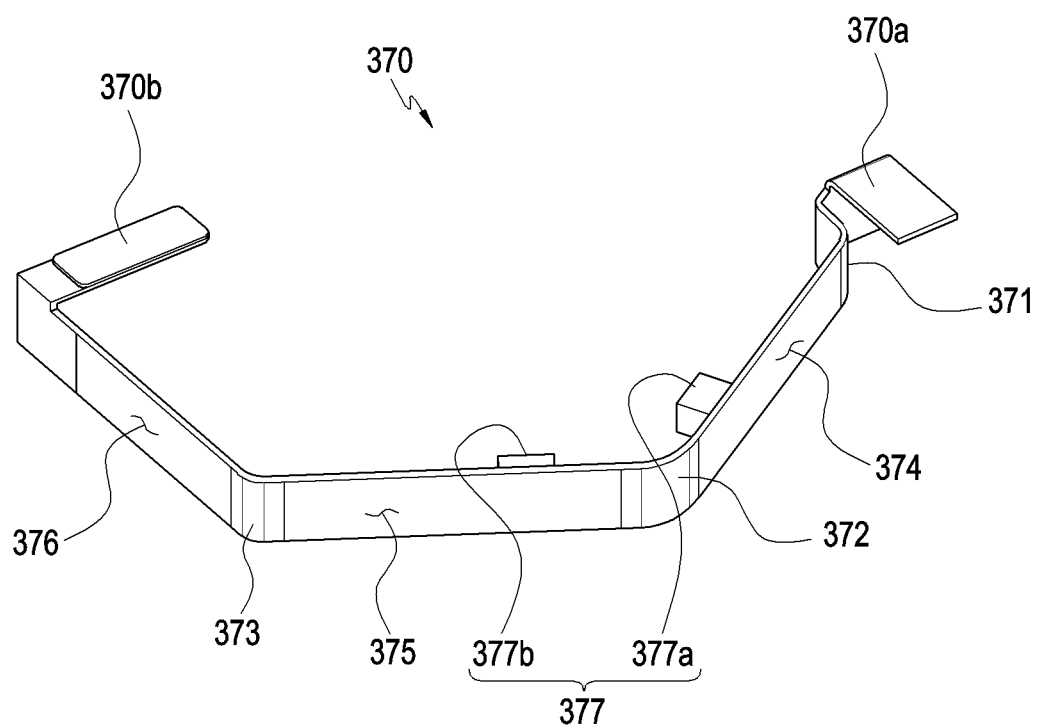
FIG. 16 is a perspective view illustrating a connection flexible printed circuit board (FPCB) according to an embodiment of the disclosure.

FIG. 16 is a perspective view illustrating a connection FPCB according to an embodiment of the disclosure.

Referring to FIGS. 15 and 16, the electronic device 101 may include a first housing 201, a second housing 202, and a battery 289. The electronic device 101 may further include a driving structure for automatically or semi-automatically providing the slide-in/out operation of the display 203. The driving structure may include a driving motor 330, a gear 320 mounted at an end of the driving motor 330, a rack 310, a connection board 340 electrically connected to the driving motor 330, and a connection FPCB 370.

The configurations of the first housing 201, the second housing 202, the battery 289, and the driving structure in FIGS. 14 and 15 may be wholly or partly the same as those of the first housing 201, the second housing 202, the battery 289, and the driving structure in FIGS. 5, 6, 7A, 7B, 8, 9, 10A, and 10B.

According to various embodiments, the connection board 340 disposed in the first housing 201 may be a component to be electrically connected to a main circuit board (e.g., the main circuit board 204 in FIGS. 4A and 4B) disposed in the second housing 202. An electrical structure (e.g., a processor) may be mounted on the main circuit board 204 to control the driving of a motor 330 or to provide power to the motor 330. The connection FPCB 370 may transmit a signal of the main circuit board to the connection board 340.

A first portion 370a corresponding to one end of the connection FPCB 370 may be electrically connected to the connection board 340, and a second portion 370b corresponding to the other end of the connection FPCB 370 may be electrically connected to the main circuit board 204. The first portion 370a of the connection FPCB 370 is connected to the connection board 340 disposed in the first housing 201 so that the first portion 370a can be slid. The second portion 370b of the connection FPCB 370 is connected to the main board disposed in the second housing 202 so that the second portion 370b can maintain the fixed state without sliding. A connector for forming contact with the connection board 340 may be disposed on the first portion 370a, and a connector for forming contact with the main circuit board 204 may be disposed on the second portion 370b.

According to various embodiments, the connection FPCB 370 may include the rigid sections 374, 375, and 376 and flexible sections 371, 372, and 373 that interconnect the rigid sections 374, 375, and 376 and are capable of forming curved surfaces. For example, two or more rigid sections 374, 375, and 376 and flexible sections 371, 372, and 373 may be provided.

According to various embodiments, the connection FPCB 370 may include a first flexible section 371 extending to one side of a first portion 370a to be connected to a connection board 340, a first rigid section 374, a second flexible section 372, a second rigid section 375, a third flexible section 373, a third rigid section 376, and a second portion 370b to be connected to the connection board 340.

According to an embodiment, the first flexible section 371 may be disposed between the first portion 370a and the first rigid section 374 to interconnect the first portion 370a and the first rigid section 374, and may be variable depending on the sliding of the first housing 201. The second flexible section 372 may be disposed between the first rigid section 374 and the second rigid section 375 to interconnect the first rigid section 374 and the second rigid section 375, and may be variable depending on the sliding of the first housing. The third flexible section 373 may be disposed between the third rigid section 376 and the second portion 370b to interconnect the third rigid section 376 and the second portion 370b, and may be variable depending on the sliding of the first housing 201.

According to an embodiment, in the slide-in state, the first flexible section 371 may be variable such that the first portion 370a and the first rigid section 374 form about 90 degrees therebetween. The second flexible section 372 may be variable such that the first rigid section 374 and the second rigid section 375 face each other. The third flexible section 373 may be variable such that the third rigid section 376 and the second portion 370b are disposed to be oriented in the same direction to exhibit a straight shape.

According to an embodiment, in the slide-out state, the first flexible section 371 may be variable such that the first portion 370a and the first rigid section 374 are disposed to form an acute angle therebetween. In the slide-out state, the second flexible section 372 may be variable such that the first rigid section 374 and the second rigid section 375 are disposed to form an obtuse angle therebetween. In the slide-out state, the third flexible section 373 may be variable such that the third rigid section 376 and the second portion 370b are disposed to form an acute angle therebetween.

According to various embodiments, an elastic member 377 may be positioned in an area of each of the first rigid section 374 and the second rigid section 375 of the connection FPCB 370. For example, a first elastic member 377a may be disposed in an area of the first rigid section 374, and a second elastic member 377b corresponding to the first elastic member 377a may be disposed in an area of the second rigid section 375.

According to an embodiment, in the slide-in state of the flexible display, the first elastic member 377a and the second elastic member 377b are disposed to be in contact with each other. Thus, the first rigid section 374 and the second rigid section 375 can be prevented from coming into contact with each other. As a result, it is possible to prevent the first rigid section 374 and the second rigid section 375 of the connection FPCB 370 from being damaged by being brought into contact with each other due to the repeated opening or closing operations of the first housing 201 relative the second housing 202 in the electronic device 101.

According to various embodiments, electrical components may be mounted in the first housing 201 and slide together with the first housing 201 when the first housing 201 slides. For example, the electrical components may include a SIM socket 350 and a speaker 360. The SIM socket 350 and the speaker 360 may be disposed adjacent to the battery 289. A separate FPCB 390 for electrical connection with the connection board 340 may be disposed on one side of the SIM socket 350 or the speaker 360.

An electronic device (e.g., the electronic device 101 in FIGS. 1, 2A, 2B, 3A, 3B, 4A, and 4B) according to various embodiments of the disclosure may include a first housing (e.g., 201 in FIGS. 2A, 2B, 3A, 3B, 4A, and 4B), a first second housing (e.g., 202 in FIGS. 2A, 2B, 3A, 3B, 4A, and 4B) in which a rack (e.g., 310 in FIGS. 4A and 4B) being configured to guide the sliding of the first housing is disposed, a flexible display (e.g., 203 in FIGS. 2A, 2B, 3A, 3B, 4A, and 4B) including a first area (e.g., A1 in FIG. 7A) and a second area (e.g., A2 in FIG. 7A) extending from the first area and configured to be bendable or rollable, a motor (e.g., 330 in FIG. 6) disposed on the first housing and configured to be capable of sliding relative to the second housing and to transmit a driving force to a gear (e.g., 320 in FIG. 6) configured to rotationally move along the rack, and a first electrical component disposed in the first housing and configured to be capable of sliding together with the motor, wherein the motor may be disposed not to overlap the second area of the flexible display.

According to various embodiments, a shaft (e.g., P1 in FIG. 7A) of the motor is disposed perpendicular to a direction of a movement of the sliding, and one surface of the motor that is oriented in a first direction may overlap the first area of the flexible display.

According to various embodiments, one surface of the motor that is oriented in the second direction opposite to the first direction may face a portion of the first housing in a slide-in state of the flexible display, and may face a portion of the second housing in a slide-out state of the flexible display.

According to various embodiments, the diameter of the motor may be in a ratio of 0.62% to 0.68% of the total thickness of the electronic device.

According to various embodiments, the electronic device may further include a main circuit board (e.g., 204 in FIG. 6) disposed in the second housing, and a connection FPCB (e.g., 370 in FIG. 6) electrically connected to the main circuit board and configured to be variable in response to the sliding of the first housing.

According to various embodiments, the first electrical component may include at least one of a speaker and a SIM socket, and the speaker or the SIM socket may be electrically connected to the main circuit board by the connection FPCB.

According to various embodiments, the first electrical component may include a battery, and the battery may be electrically connected to the main circuit board by the connection FPCB.

According to various embodiments, the battery disposed in the electronic device may include a first battery (e.g., 289a in FIG. 6) disposed in the first housing and a second battery (e.g., 289b in FIG. 6) disposed in the second housing to be spaced apart from the first battery, and the first electrical component is the first battery, which may be electrically connected to the main circuit board by the connection FPCB.

According to various embodiments, the motor may be disposed in parallel with at least a portion of the first battery.

According to various embodiments, in the slide-in state of the flexible display, the rack may be disposed between the first battery and the second battery.

According to various embodiments, the electronic device may further include a connection board (e.g., 340 of FIG. 6) positioned in the first housing and disposed adjacent to the motor and the rack, and the main circuit board and the connection board may be rigid boards.

According to various embodiments, a first portion (e.g., 370a in FIG. 16) corresponding to one end of the connection FPCB may be electrically connected to the connection board, and a second portion (e.g., 370b in FIG. 16) corresponding to the other end may be electrically connected to the main circuit board. The first portion of the connection FPCB may slide in response to the sliding of the first housing, and the second portion may maintain a fixed state without the sliding.

According to various embodiments, the connection FPCB may include a plurality of rigid sections (e.g., 374, 375, and 376 in FIG. 16) positioned between the first portion and the second portion and flexible sections (e.g., 371, 372, and 373 of FIG. 16) interconnecting the rigid sections and being able to form curved surfaces.

According to various embodiments, the connection FPCB may include a first rigid section (e.g., 374 in FIG. 16), a first flexible section (e.g., 371 in FIG. 16) interconnecting the first portion and the first rigid section and configured to be variable in response to the slide movement of the first housing, a second rigid section (e.g., 375 in FIG. 16) disposed to face the first rigid section in the slide-in state of the flexible display, a second flexible section (e.g., 372 in FIG. 16) interconnecting the first rigid section and the second rigid section and configured to be variable in response to the slide movement of the first housing, a third rigid section (e.g., 376 in FIG. 16) extending from the second portion, and a third flexible section (e.g., 373 in FIG. 16) interconnecting the second rigid section and the third rigid section and configured to be variable in response to the slide movement of the first housing.

According to various embodiments, the connection FPCB may include a first elastic member (e.g., 377a in FIG. 16) disposed in an area of the first rigid section, and a second elastic member (e.g., 377b in FIG. 16) disposed in an area of the second rigid section to correspond to the first elastic member. In the slide-in state of the flexible display, the first elastic member and the second elastic member may prevent the first rigid section and the second rigid section from coming into contact with each other by being disposed to be in contact with each other.

According to various embodiments, the electronic device may further include a processor configured to control the driving of the motor, and the processor may be configured to control the driving of the motor to automatically or semi-automatically provide a slide-in/out operation of the flexible display.

An electronic device (e.g., the electronic device 101 in FIGS. 1, 2A, 2B, 3A, 3B, 4A, and 4B) according to various embodiments of the disclosure may include a first housing (e.g., 201 in FIGS. 2A, 2B, 3A, 3B, 4A, and 4B), a second housing (e.g., 202 in FIGS. 2A, 2B, 3A, 3B, 4A, and 4B) configured to guide the slide movement of the first housing, a flexible display (e.g., 203 in FIGS. 2A, 2B, 3A, 3B, 4A, and 4B) including a first area (e.g., A1 in FIGS. 7A and 7B) and a second area (e.g., A2 in FIGS. 7A and 7B) extending from the first area and configured to be bendable or rollable, and a driving structure configured to provide automatic or semi-automatic slide-in/out of the first housing and the flexible display. The driving structure may include a rack (e.g., 310 in FIG. 6) disposed in the second housing along the slide movement direction, a motor (e.g., 330 in FIG. 6) disposed in the first housing not to overlap the second area of the flexible display, a gear (e.g., 320 of FIG. 6) rotatably connected to an end of the motor and configured to move along the rack, and a connection board (e.g., 340 of FIG. 6) disposed adjacent to the motor and the rack.

According to various embodiments, the electronic device may further include a first electrical component disposed in the first housing and configured to be capable of slide movement together with the motor.

According to various embodiments, the shaft of the motor may be disposed to be perpendicular to the slide movement direction, and the motor may be disposed not to overlap the second area of the flexible display.

According to various embodiments, one surface of the motor that is oriented in a first direction may overlap the first area of the flexible display.

According to various embodiments, the electronic device may further comprise a battery disposed in a recess formed in the first housing.

According to various embodiments, the rack may be disposed adjacent to a lower end of the battery.

According to various embodiments, the motor may be disposed adjacent to a side of the battery.

According to various embodiments, the electronic device may further comprise a battery disposed in the second housing.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a first housing;
a second housing disposed to be slidable relative to the first housing;
a flexible display including:
a first area, and
a second area extending from the first area and configured to be bendable or rollable;
a rack configured to guide a sliding of the first housing;
a motor disposed on the first housing and configured to transmit a driving force to a gear engaged with the rack;
a first battery disposed in the first housing and capable of moving along with the first housing; and
a second battery fixedly disposed on one side of the rack in the second housing,
wherein the motor is disposed so as not to overlap the second area of the flexible display
wherein the rack does not overlap with the first battery or the second battery, when viewed in a direction perpendicular to a back surface of the electronic device.

2. The electronic device of claim 1,
wherein a shaft of the motor is disposed to be perpendicular to a direction of a movement of the sliding, and
wherein one surface of the motor that is oriented in a first direction overlaps the first area of the flexible display.

3. The electronic device of claim 2, wherein one surface of the motor that is oriented in a second direction opposite to the first direction faces a portion of the first housing in a slide-in state of the flexible display, and faces a portion of the second housing in a slide-out state of the flexible display.

4. The electronic device of claim 2, wherein the motor has a diameter that is provided in a ratio of 0.62 to 0.68 of a total thickness of the electronic device.

5. The electronic device of claim 1, further comprising:
a main circuit board disposed in the second housing; and
a connection flexible printed circuit board (FPCB) electrically connecting the main circuit board and the first battery, the connection FPCB configured to be variable in response to the sliding of the first housing.

6. The electronic device of claim 5,
further comprising at least one of a speaker or a subscriber identification module (SIM) socket, and
wherein the speaker or the SIM socket is electrically connected to the main circuit board by the connection FPCB.

7. The electronic device of claim 5,
wherein the first battery is electrically connected to the main circuit board by the connection FPCB.

8. The electronic device of claim 1, wherein the motor is disposed in parallel to at least a portion of the first battery.

9. The electronic device of claim 1, wherein the rack is disposed between the first battery and the second battery in a slide-in state of the flexible display.

10. The electronic device of claim 5, further comprising:
a connection board positioned in the first housing and disposed adjacent to the motor and the rack,
wherein the main circuit board and the connection board are rigid boards.

11. The electronic device of claim 9,
wherein a first portion corresponding to one end of a connection flexible printed circuit board (FPCB) is electrically connected to a connection board,
wherein a second portion corresponding to another end of the connection FPCB is electrically connected to the main circuit board,
wherein the first portion of the connection FPCB slides in response to the sliding of the first housing, and
wherein the second portion maintains a fixed state without the sliding.

12. The electronic device of claim 11, wherein the connection FPCB includes:
a plurality of rigid sections positioned between the first portion and the second portion, and
flexible sections that interconnect the rigid sections and are capable of forming curved surfaces.

13. The electronic device of claim 11, wherein the connection FPCB includes:
a first rigid section;
a first flexible section interconnecting the first portion and the first rigid section and configured to be variable in response to the sliding of the first housing;
a second rigid section disposed to face the first rigid section while the flexible display is in a slide-in state;
a second flexible section interconnecting the first rigid section and the second rigid section and configured to be variable in response to the sliding of the first housing;
a third rigid section extending from the second portion; and
a third flexible section interconnecting the second rigid section and the third rigid section and configured to be variable in response to the sliding of the first housing.

14. The electronic device of claim 13, wherein the connection FPCB includes:

a first elastic member disposed in an area of the first rigid section; and
a second elastic member disposed to correspond to the first elastic member in an area of the second rigid section,
wherein, while the flexible display is in the slide-in state, the first elastic member and the second elastic member prevent the first rigid section and the second rigid section from coming into contact with each other by being disposed to be in contact with each other.

15. The electronic device of claim 1, further comprising:
a processor configured to control driving of the motor,
wherein the processor is configured to control the driving of the motor to automatically provide a slide-in/out operation of the flexible display.

* * * * *